United States Patent
Seto

(10) Patent No.: US 10,430,962 B2
(45) Date of Patent: Oct. 1, 2019

(54) THREE-DIMENSIONAL SHAPE MEASURING APPARATUS, THREE-DIMENSIONAL SHAPE MEASURING METHOD, AND STORAGE MEDIUM THAT CALCULATE A THREE-DIMENSIONAL SHAPE OF AN OBJECT BY CAPTURING IMAGES OF THE OBJECT FROM A PLURALITY OF DIRECTIONS

(71) Applicant: CANON KABUSHIKI KAISHA, Tokyo (JP)

(72) Inventor: Takamasa Seto, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 15/470,286

(22) Filed: Mar. 27, 2017

(65) Prior Publication Data
US 2017/0287157 A1     Oct. 5, 2017

(30) Foreign Application Priority Data
Mar. 30, 2016   (JP) ................................ 2016-068637

(51) Int. Cl.
- *G06T 7/60* (2017.01)
- *G01B 11/25* (2006.01)
- *G06K 9/20* (2006.01)

(52) U.S. Cl.
CPC ............ *G06T 7/60* (2013.01); *G01B 11/2509* (2013.01); *G01B 11/2513* (2013.01); *G06K 9/209* (2013.01); *G06K 9/2027* (2013.01); *G06K 9/2036* (2013.01)

(58) Field of Classification Search
None
See application file for complete search history.

(56) References Cited

U.S. PATENT DOCUMENTS

| | | | | |
|---|---|---|---|---|
| 2010/0195114 | A1* | 8/2010 | Mitsumoto | G01B 11/245 356/601 |
| 2014/0368835 | A1* | 12/2014 | Tabata | G01B 11/245 356/612 |

OTHER PUBLICATIONS

T. Zaman, "Development of a Topographic Imaging Device," Delft University of Technology, 2013, pp. 1-143.

* cited by examiner

*Primary Examiner* — Eileen M Adams
(74) *Attorney, Agent, or Firm* — Venable LLP

(57) ABSTRACT

A control apparatus acquires a group of images, including an image acquired by capturing an image of an object irradiated with first pattern light, an amount of the first pattern light changing periodically, in a predetermined direction, and an image acquired by capturing images of the object irradiated with second pattern light, an amount of the second pattern light changing periodically, in the predetermined direction, and having a phase difference from the first pattern light. The control apparatus also acquires one image by capturing an image of the object irradiated with third pattern light, that provides for identification of a position of at least one period, of a plurality of periods, included in one of the first pattern light and the second pattern light, and calculates a three-dimensional shape of the object based on the group of images and the one image, for each of a plurality of directions.

13 Claims, 16 Drawing Sheets

STRIPE PATTERN $I_0$

REFERENCE POSITION PATTERN

STRIPE PATTERN $I_1$

COLOR ACQUISITION PATTERN

STRIPE PATTERN $I_2$

| EXPOSURE SETTING NUMBER | F-STOP Av | SHUTTER SPEED Tv | ISO SPEED | REMARKS |
|---|---|---|---|---|
| 0 | 11 | 1/15 | 50 | |
| 1 | 11 | 1/8 | 200 | SETTING FOR IMAGE CAPTURING OF STRIPE PATTERN |
| 2 | 11 | 1s | 200 | |
| 3 | 11 | 1/4 | 200 | SETTING FOR IMAGE CAPTURING OF POSITIONING PATTERN |
| 4 | 11 | 1/8 | 200 | SETTING FOR IMAGE CAPTURING OF COLOR ACQUISITION PATTERN |

FIG.6

| CAPTURED IMAGE NUMBER | PROJECTED PATTERN NUMBER | EXPOSURE SETTING NUMBER | REMARKS |
|---|---|---|---|
| 0 | 0 | 0 | IMAGE CAPTURING OF STRIPE PATTERN |
| 1 | 0 | 1 | |
| 2 | 0 | 2 | |
| 3 | 1 | 0 | |
| 4 | 1 | 1 | |
| 5 | 1 | 2 | |
| 6 | 2 | 0 | |
| 7 | 2 | 1 | |
| 8 | 2 | 2 | |
| 9 | 3 | 3 | IMAGE CAPTURING OF REFERENCE POSITION PATTERN |
| 10 | 4 | 4 | IMAGE CAPTURING OF COLOR ACQUISITION PATTERN |

FIG.7

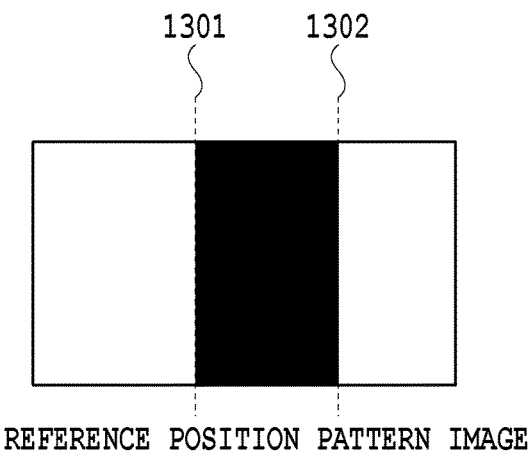
FIG.13A
REFERENCE POSITION PATTERN IMAGE
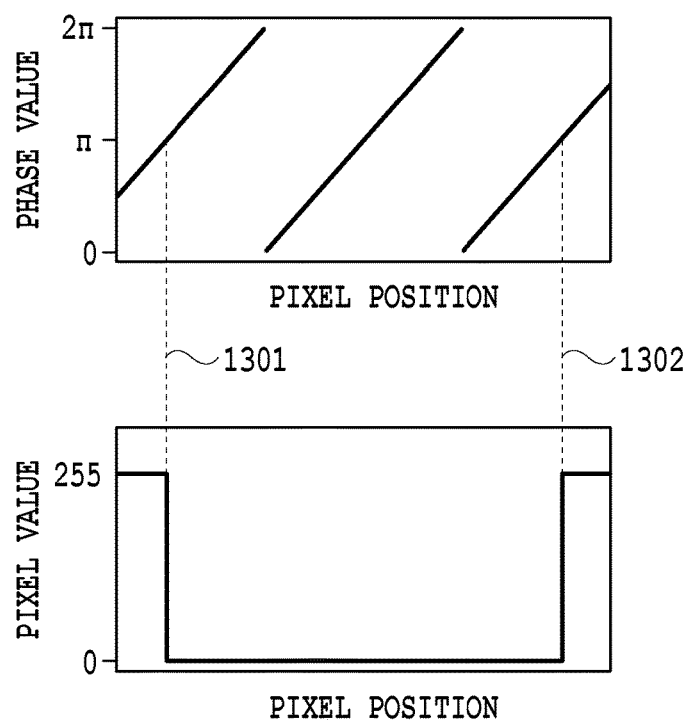
FIG.13B
FIG.13C

THREE-DIMENSIONAL SHAPE MEASURING APPARATUS, THREE-DIMENSIONAL SHAPE MEASURING METHOD, AND STORAGE MEDIUM THAT CALCULATE A THREE-DIMENSIONAL SHAPE OF AN OBJECT BY CAPTURING IMAGES OF THE OBJECT FROM A PLURALITY OF DIRECTIONS

This application claims the benefit of Japanese Patent Application No. 2016-068637, filed on Mar. 30, 2016, which is hereby incorporated by reference herein in its entirety.

BACKGROUND OF THE INVENTION

Field of the Invention

The present invention relates to a technique to measure a three-dimensional shape of a measurement-target object.

Description of the Related Art

Conventionally, as a method of measuring a three-dimensional shape of a measurement-target object in a high density, a stereo phase-shift method is known (e.g., T. Zaman, "Development of a Topographic Imaging Device", Delft University of Technology, 2013). In the stereo phase-shift method, the phase of a pattern in a form of a stripe (hereafter, stripe pattern), having a luminance that changes periodically, is shifted a plurality of times, and then, the stripe pattern is projected onto a measurement-target object and images are captured from two different directions. Then, from the images captured from the two directions, the phase value of each pixel in each direction is calculated, and, from correspondence between the phase values in the two directions, the three-dimensional shape of the measurement-target object is calculated by using the principle of triangulation. By positively projecting a pattern and calculating the phase value, as described above, it is made possible to measure a three-dimensional shape with a high accuracy and in a high density, even in a case in which the color of a measurement-target object is uniform. Further, by capturing images from two different directions, it is made possible to measure a three-dimensional shape with a high accuracy, even in a case in which a projection device and an image capturing device have nonlinear output characteristics.

The prior art has such a problem, however, that, in a case in which the density range of a measurement-target object is wide, the contrast of a stripe pattern projected onto a dark portion of the measurement-target object decreases, and the projected stripe pattern is embedded in noise of the image capturing device, and, therefore, estimation of the phase value becomes difficult. It is possible to reduce the influence of noise of the image capturing device by capturing a plurality of images by changing the exposure condition of the image capturing device, and by performing High Dynamic Range (HDR) combination of the obtained images, but, in this case, the number of captured images increases and the image capturing time lengthens. In particular, with the stereo phase-shift method of the prior art, it is necessary to project a plurality of patterns called a gray code for specifying the period of the phase, in addition to the stripe patterns with changed phases. Due to the product of the number of gray codes to be projected and the number of exposure conditions of the HDR combination, the number of captured images increases. Further, in a case in which the measurement-target object is a cultural property, such as an oil painting, it is necessary to alleviate damage to the cultural property by reducing the number of captured images to reduce the amount of light exposed to the cultural property.

Consequently, an object of the present invention is to provide a three-dimensional shape measuring apparatus and a three-dimensional shape measuring method capable of measuring a three-dimensional shape of a measurement-target object having a wide density range with a high accuracy and with a small number of captured images.

SUMMARY OF THE INVENTION

According to one aspect, the present invention provides a three-dimensional shape measuring apparatus including a projection unit configured to project a stripe pattern having a luminance that changes periodically, and a reference position pattern indicating a position of at least one period, of a plurality of periods of the stripe pattern, as a reference position, onto a measurement-target object, an image capturing unit configured to capture images of the measurement-target object from a plurality of directions, a control unit configured to control the projection unit and the image capturing unit, to acquire a captured image of the stripe pattern by performing control so that the image capturing unit captures images of the measurement-target object from the plurality of directions under a plurality of exposure conditions at a time at which the stripe pattern is projected, and to acquire a captured image of the reference position pattern by performing control so that the image capturing unit captures images of the measurement-target object from the plurality of directions under one exposure condition at a time at which the reference position pattern is projected, and a shape calculation unit configured to calculate a three-dimensional shape of the measurement-target object based on a captured image of the stripe pattern and a captured image of the reference position pattern.

Further features of the present invention will become apparent from the following description of exemplary embodiments with reference to the attached drawings.

BRIEF DESCRIPTION OF THE DRAWINGS

FIG. 6 is a diagram for explaining exposure conditions in the first embodiment.

FIG. 7 is a diagram for explaining settings of the projected patterns and the exposure conditions in the first embodiment.

FIG. 11 is a diagram showing the relationship of FIG. 11A and FIG. 11B.

FIG. 13A to FIG. 13C are diagrams showing a reference position pattern in a second embodiment.

DESCRIPTION OF THE EMBODIMENTS

In the following, embodiments of the present invention are explained with reference to the drawings. The following embodiments are not intended to limit the present invention and all the combinations of the features explained in the present embodiments are not necessarily indispensable to solve the problem of the present invention. Explanation is given by attaching the same symbol to the same configuration.

First Embodiment

In the present embodiment, a three-dimensional shape measuring apparatus that acquires roughness shape information and color information on a surface by taking an object substantially in a form of a plane having roughness of several mm to several tens µm on the surface, such as an oil painting, as a measurement-target object.

Three-Dimensional Shape Measuring Apparatus

Figure 1A:
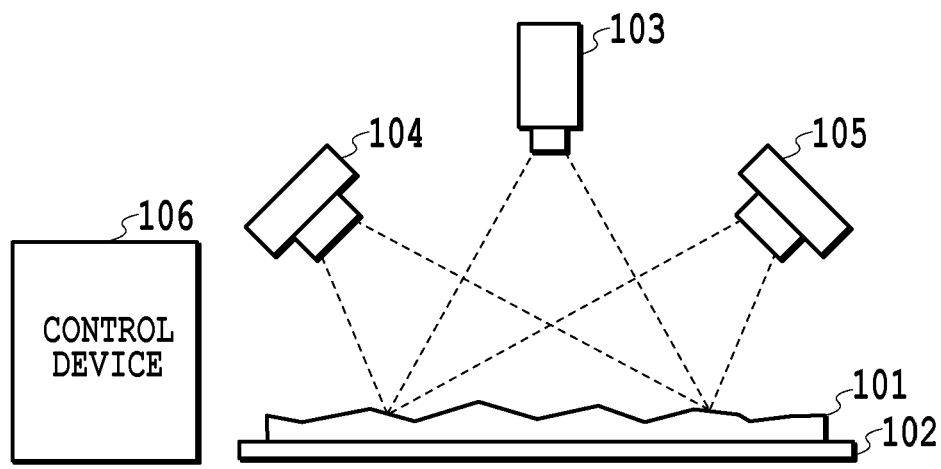
FIG. 1A and FIG. 1B are diagrams showing an outline configuration of a three-dimensional shape measuring apparatus in a first embodiment.
Figure 1B:
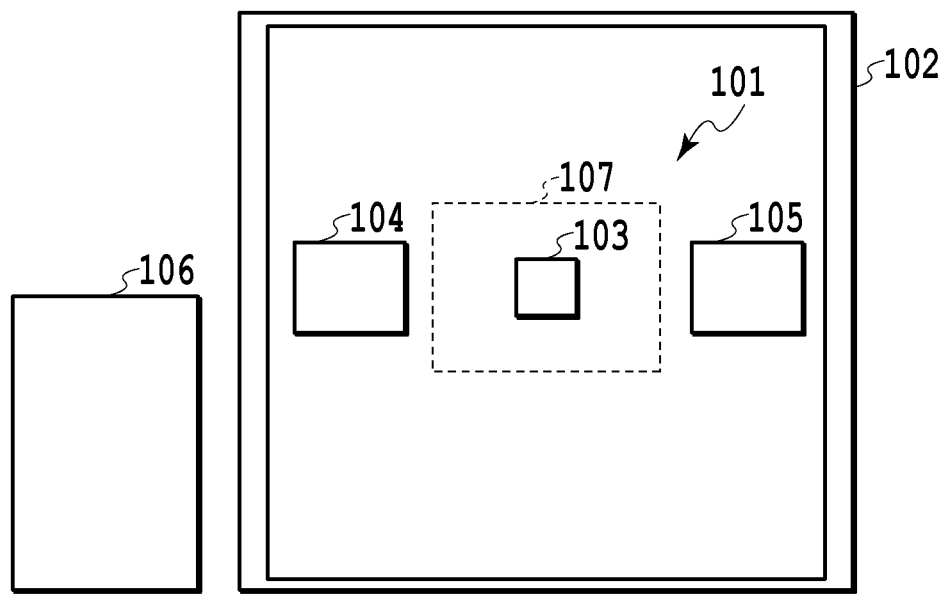

FIG. 1A and FIG. 1B are diagrams showing an outline configuration of a three-dimensional shape measuring apparatus in the present embodiment. FIG. 1A is a front view in a case in which the three-dimensional shape measuring apparatus is viewed from the front and FIG. 1B is a top view in a case in which the three-dimensional shape measuring apparatus is viewed from above. A measurement-target object 101 that is a target of measurement is fixed on a sample table 102. A projection device 103 is a device to project a two-dimensional pattern, which is necessary for three-dimensional shape measurement, onto the measurement-target object 101. As the projection device 103, it is possible to use, for example, a 640 pixels×480 pixels single-plate monochrome Digital Light Processing (DLP) projector that uses light emitting diode (LED) light source, but the projection device 103 is not limited to this type of projection device. Any projection device may be used as long as the projection device is able to project a two-dimensional pattern onto the measurement-target object 101.

Image capturing devices 104 and 105 are each a device to capture an image of the measurement-target object 101 onto which a two-dimensional pattern is projected, and, for example, an image capturing device, such as a Digital Single Lens Reflex (DSLR) camera. As the image capturing devices 104 and 105, it is possible to use, for example, a combination of a DSLR camera having an 8,688 pixels×5,792 pixels complementary metal oxide semiconductor (CMOS) area sensor and a macro lens with a focal length of 100 mm, but the image capturing devices 104 and 105 are not limited to this configuration. It may also be possible to use a tilt lens, or the like, so that the surface of the measurement-target object 101 comes in focus on the entire surface of a measurement range 107. In the present embodiment, it is assumed that the image capturing devices 104 and 105 have photoelectric conversion characteristics that obtain a linear signal value for the luminance on the measurement-target object 101 and an image to be recorded has color information on three channels of red, green, and blue (RGB) for each pixel and each channel is quantized with 16 bits.

A control device 106 is a device to control the projection device 103, the image capturing device 104, and the image capturing device 105, and to perform a series of control processes to calculate a three-dimensional shape of the measurement-target object 101. In the present embodiment, the control device 106 is described as a personal computer (PC), including a central processing unit (CPU) and including main storage devices, such as a random access memory (RAM), and auxiliary storage devices, such as a hard disk (HD) and a flash memory. The control device 106 is not limited, however, to a PC, and may be a microcomputer, or the like, incorporated as part of a three-dimensional shape measuring apparatus. The CPU of the control device 106 executes programs stored in the HD, or the like, by using the RAM as a work memory, and controls the entire operation of the three-dimensional shape measuring apparatus. The programs executed by the CPU include programs for shape measuring processing, or the like, to be described later.

The projection device 103, the image capturing device 104, and the image capturing device 105 are connected with the control device 106, respectively, via an interface, such as a universal serial bus (USB) interface, not shown schematically. As shown in FIG. 1A, in the present embodiment, the projection device 103 is arranged above the measurement-target object 101 so as to face the measurement-target object 101 and projects a two-dimensional pattern onto a range including the measurement range 107. The image capturing device 104 and the image capturing device 105 are arranged so as to capture the image of the measurement-target object 101 from the right and left directions, respectively. Further, the image capturing devices 104 and 105 are arranged so that the measurement range 107 is included in the image capturing angle of view.

Figure 2:
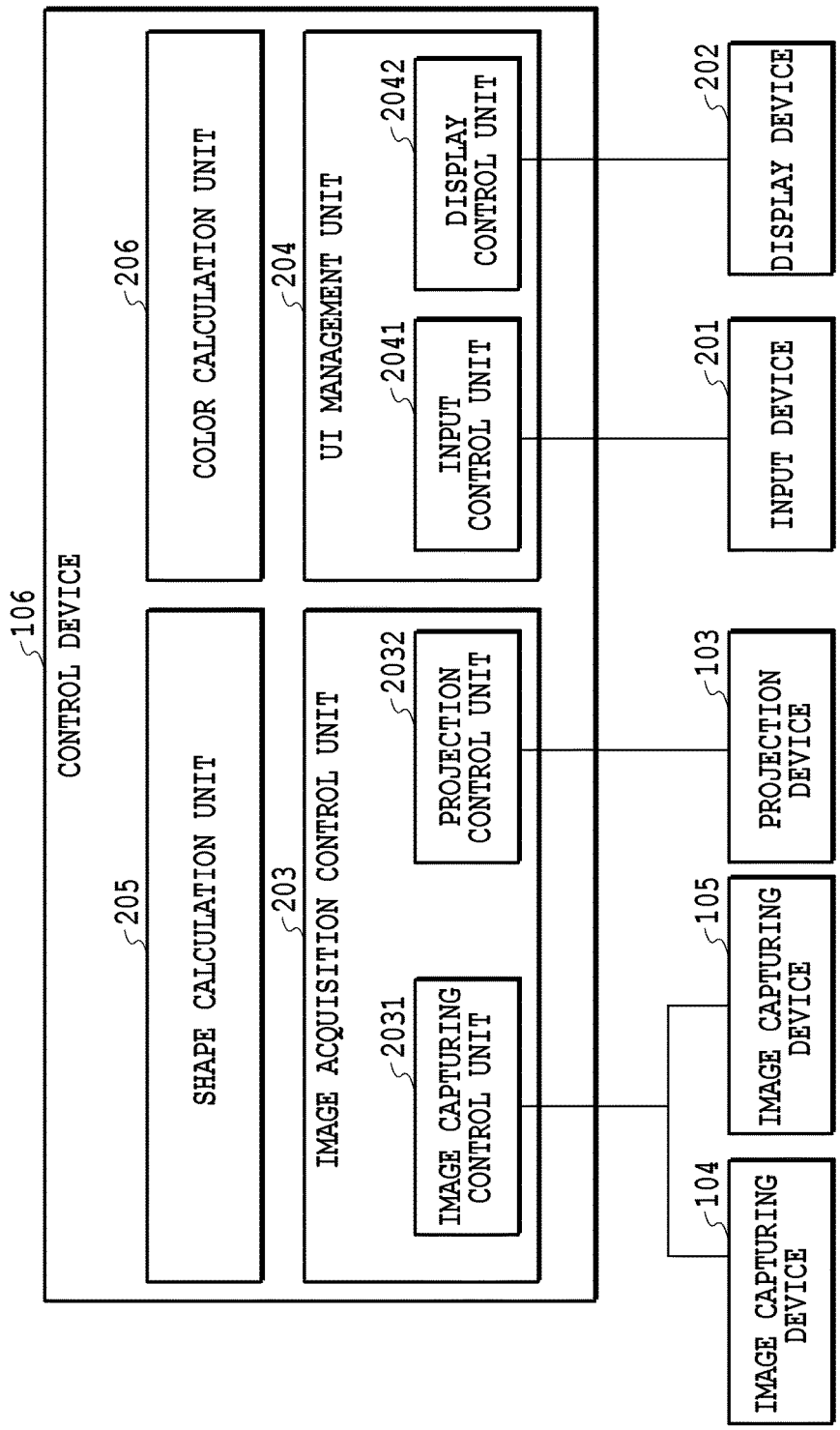
FIG. 2 is a block diagram showing a function configuration of the three-dimensional shape measuring apparatus in the first embodiment.

FIG. 2 is a block diagram showing a function configuration of the three-dimensional shape measuring apparatus in the present embodiment. An input device 201, not shown in FIG. 1A and FIG. 1B, is a device to receive an operation from a user, and is, for example, a device, such as a keyboard or a mouse. Further, a display device 202, not shown in FIG. 1A and FIG. 1B, is a device to present contents input by a user, a measurement condition, and measurement results to the user, and is, for example, a device, such as a liquid crystal monitor. In the following description, with reference to FIG. 2, each function configuration included in the control device 106 is explained.

An image acquisition control unit 203 is configured to control the projection device 103 and the image capturing devices 104 and 105 so as to acquire a captured image that is used for shape calculation by a shape calculation unit 205, to be described later, and includes an image capturing control unit 2031 and a projection control unit 2032. The image capturing control unit 2031 is configured to control the image capturing device 104 and the image capturing device 105, and, for example, changes the image capturing condition of each image capturing device, gives instructions to perform image capturing, receives a captured image from each image capturing device, and so on. The projection control unit 2032 is configured to control the projection device 103, and, for example, transmits a pattern to be projected (hereafter, called a projected pattern) to the projection device 103, gives instructions to start or to end projection, and so on.

A user interface (UI) management unit 204 is configured to perform processing, such as processing to manage information input by a user via the input device 201 and processing to cause the display device 202 to display three-dimensional shape measurement results, and includes an input control unit 2041 and a display control unit 2042. The input control unit 2041 is configured to control the input device 201, and the display control unit 2042 is configured to control the display device 202. The shape calculation unit 205 calculates a three-dimensional shape of the measurement-target object 101 based on a captured image acquired by the image acquisition control unit 203. A color calculation unit 206 calculates color information corresponding to a three-dimensional shape calculated by the shape calculation unit 205. Details of the color calculation unit 206 will be described later.

Three-Dimensional Shape Measuring Processing

Figure 3:
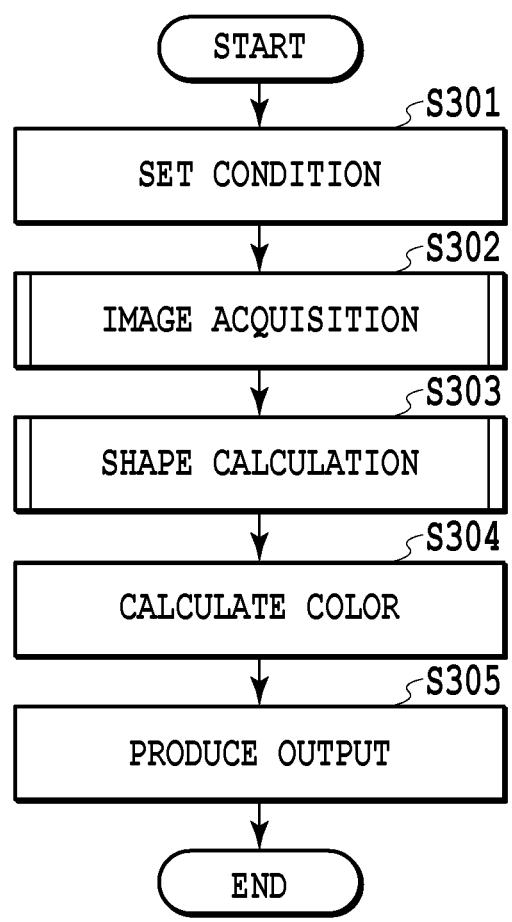
FIG. 3 is a flowchart showing a flow of three-dimensional shape measuring processing in the first embodiment.

FIG. 3 is a flowchart showing a flow of three-dimensional shape measuring processing performed by the three-dimensional shape measuring apparatus in the present embodiment. The processing at each step shown in FIG. 3 is implemented by the CPU reading a program stored in the HD, or the like, onto the RAM and executing the program. Symbol S means that the step is a step in the flowchart. First, at step S301, the UI management unit 204 prompts a user to perform the setting of image capturing conditions, or the like, of the image capturing device 104 and the image capturing device 105 via the display device 202. Details of the setting of image capturing conditions will be described later. On the completion of the setting of image capturing conditions by a user via the input device 201, the processing advances to an image acquisition step S302.

At step S302, the image acquisition control unit 203 acquires a captured image of a projected pattern by causing the image capturing devices 104 and 105 to capture an image of the measurement-target object 101 at the time at which the projection device 103 projects the projected pattern onto the measurement-target object 101. Details of the image acquisition step S302 will be described later. On the completion of the captured image acquisition processing at step S302, the processing advances to a shape calculation step S303. At step S303, the shape calculation unit 205 calculates three-dimensional shape information on the measurement-target object 101 based on the captured image acquired at S302. The three-dimensional shape information calculated in the present embodiment is point group information in which each of X, Y, and Z coordinate values with the center of the area sensor of the image capturing device 104 as the origin is recorded by 32-bit floating point numbers in units of mm and has coordinate values in the same number as the number of pixels of the area sensor. Here, the X-axis, the Y-axis, and the Z-axis are axes of a Cartesian coordinate system, and the X-axis and the Y-axis make up a plane including the area sensor plane of the image capturing device 104 and the Z-axis is defined in the direction perpendicular to the X-axis and the Y-axis.

At step S304, the color calculation unit 206 calculates color information on RGB corresponding to each point of the point group information calculated at step S303. Specifically, the processing at this step is processing to record color information on each pixel of an image captured by the image capturing device 104 at the time at which a color acquisition pattern, to be described later, is projected onto the measurement-target object 101 in association with the point group information calculated at step S303. In the present embodiment, the coordinate values of each point included in the point group information are calculated so as to correspond to each pixel of the image captured by the image capturing device 104 in a one-to-one manner. Because of this, in the processing at step S304, the XYZ coordinates are searched for from the point group information for each pixel and information of 144 bits in total of XYZRGB obtained by adding color information of 48 bits in total, i.e., 16 bits for each of RGB, to the coordinate values searched for is recorded. Finally, at step S305, the UI management unit 204 displays the point group information to which the color information is added on the display device 202 and terminates the processing. Specifically, at this step, processing to display a list of each numerical value of the point group information to which the color information is added on the display device 202 or processing to display a projection viewed in an arbitrary direction by plotting the XYZ coordinates in a color corresponding to the color information on a three-dimensional space is performed. The processing at step S305 is not limited to this processing, and it may also be possible to make up processing so as to directly record the point group information to which the color information is added in the HD or the flash memory, not shown schematically, without producing a display on the display device 202.

Projected Pattern

Figure 4A:
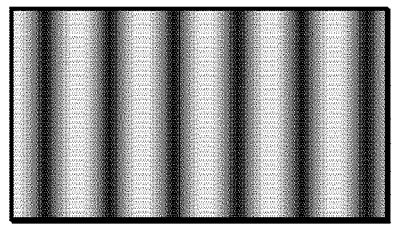
FIG. 4A to FIG. 4E are each a diagram showing a projected pattern in the first embodiment.
Figure 4D:
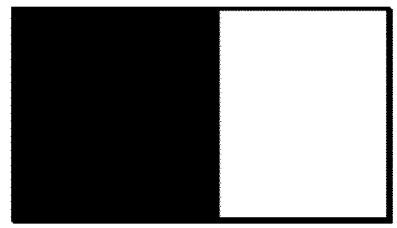
Figure 4B:
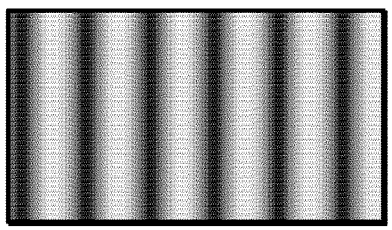
Figure 4E:
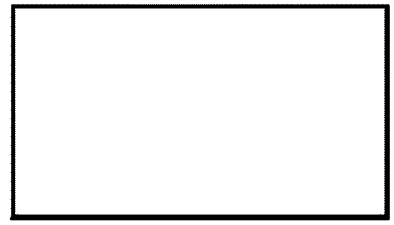
Figure 4C:
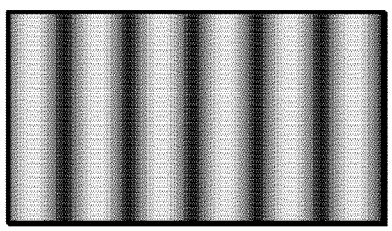

FIG. 4A to FIG. 4E are each a diagram showing a pattern that is projected by the projection device 103 in the present embodiment. Explanation is given on the assumption that these projected patterns are 640 pixels×480 pixels, corresponding to the pixels of the projection device 103 in a one-to-one manner, 8-bit grayscale images having a pixel value between 0 (black) and 255 (white). The number of pixels, the bit depth, the number of colors, etc., are not limited to those described above. FIG. 4A to FIG. 4C each show a stripe pattern. In the present embodiment, these stripe patterns are projected onto the measurement-target object 101, the phase is calculated based on a captured image, and a three-dimensional shape of the measurement-target object 101 is calculated based on the phase. These stripe patterns are patterns (sinusoidal patterns) in the shape of a stripe having a luminance that changes sinusoidally and can be created by expressions (1) to (3) below.

$$I_0(j, i) = 127\left\{1 + \sin\left(\frac{2\pi j}{N_{cycle}}\right)\right\} \quad (1)$$

$$I_1(j, i) = 127\left\{1 + \sin\left(\frac{2\pi j}{N_{cycle}} + \frac{2\pi}{3}\right)\right\} \quad (2)$$

$$I_2(j, i) = 127\left\{1 + \sin\left(\frac{2\pi j}{N_{cycle}} + \frac{4\pi}{3}\right)\right\} \quad (3)$$

Here, (j, i) is a set of two-dimensional coordinates indicating the position of a pixel, and j indicates the position of the pixel in the horizontal direction and i indicates the position of the pixel in the vertical direction. $I_0$ (j, i), $I_1$ (j, i), and $I_2$ (j, i) are pixel values, respectively, of the positions (j, i) of the stripe patterns shown in FIG. 4A, FIG. 4B, and FIG. 4C. $N_{cycle}$ is a parameter representing the number of pixels per period of a sinusoidal wave. In the present embodiment, an explanation is given by taking the case as an example in which the stripe pattern shown in FIG. 4A is projected onto the measurement-target object 101 three times by shifting the phase by ⅓ periods each time, but the invention is not limited to this case. For example, it may also be possible to project the stripe pattern shown in FIG. 4A onto the measurement-target object 101 six times by shifting the phase by ⅙ periods each time. FIG. 4D shows a reference position pattern. The reference position pattern is a pattern indicating the position of at least one period of a plurality of periods of the stripe pattern as a reference position. As shown in FIG. 4D, the reference position pattern in the present embodiment is created so that one step edge is provided in parallel to the stripe pattern. Here, the step edge is an edge around which a change in luminance is abrupt, i.e., an edge having an edge intensity that is greater than or equal to a predetermined value.

In the present embodiment, the phase is calculated for each image capturing device based on images captured by the image capturing device 104 and the image capturing device 105 at the time at which the stripe patterns in FIG. 4A to FIG. 4C are projected onto the measurement-target object 101. Then, from the pixel position at which the phase is the same between both the image capturing devices, a three-dimensional shape is calculated by using the principle of triangulation. In the image captured at the time at which the stripe pattern is projected, sinusoidal waves corresponding to a plurality of periods are included, and, therefore, the phase value of a phase image to be calculated repeatedly takes a value between 0 and 2π periodically. That is, there exists periodically a plurality of pixels having the same phase value within the same phase image. Consequently, phase unwrapping processing to add an offset (period identification number×2π) different for each period is performed in order to avoid a pixel having the same phase value within the phase image from existing periodically. At the time of determining the offset, the reference position pattern in FIG. 4D is used.

Specifically, first, from each of the images captured by the image capturing devices 104 and 105 at the time at which the reference position pattern is projected, the reference position (position of the step edge portion) is extracted. Then, a period identification image representing a period identification number of each pixel position of the phase image is generated so that the period identification number of the phase image corresponding to the extracted position is the same value (common predetermined number) between the image capturing device 104 and the image capturing device 105. Further, the phase unwrapping processing of the phase image is performed using the generated period identification image. Due to this, it is made possible to generate an unwrapped phase image for which matching of the phase image has been performed between the image capturing devices. The present embodiment employs a configuration in which both the captured image of the reference position pattern and the phase image are used at the time of generating the period identification image for the phase image, and, therefore, it is made possible to perform matching between the phase images of different image capturing devices by making use of one reference position pattern.

Figure 5A:
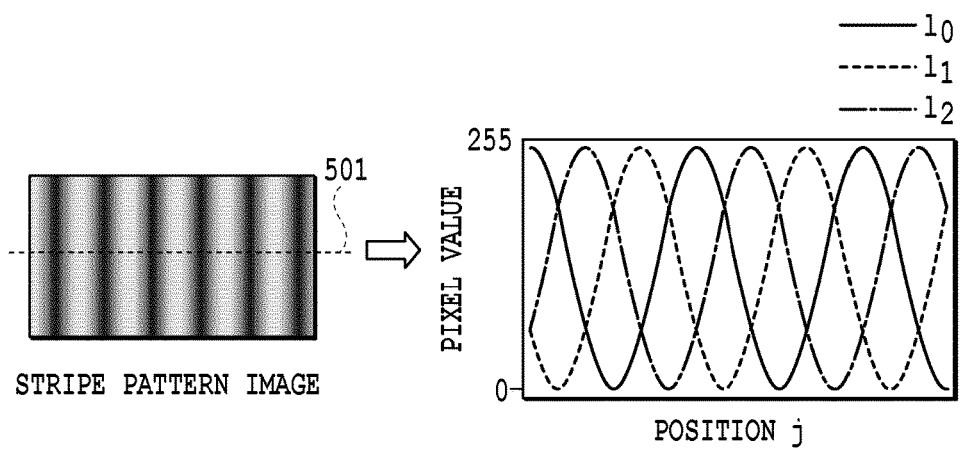
FIG. 5A to FIG. 5C are diagrams for explaining a utilization method of a stripe pattern and a reference position pattern in the first embodiment.
Figure 5B:
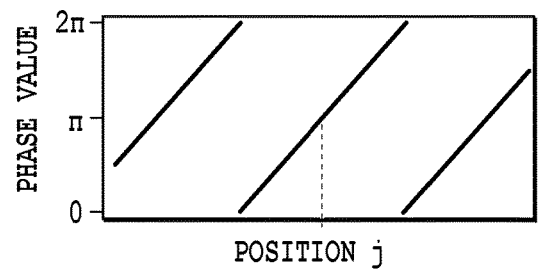
Figure 5C:
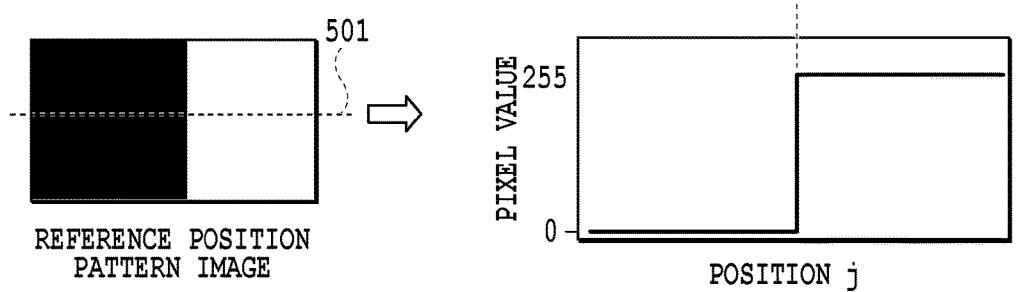

FIG. 5A to FIG. 5C are diagrams for explaining a utilization method of a stripe pattern and a reference position pattern. FIG. 5A is a line profile indicating a change in the pixel value on a segment 501 of the stripe patterns shown in FIG. 4A, FIG. 4B, and FIG. 4C. Based on these stripe patterns, it is possible to calculate the phase value of each pixel of the stripe pattern in FIG. 4A by expression (4) below.

$$\Phi(j, i) = \tan^{-1}\left(\frac{\sqrt{3}(I_1(j, i) - I_2(j, i))}{2I_0(j, i) - I_1(j, i) - I_2(j, i)}\right) \quad (4)$$

Here, it is assumed that $\Phi(j, i)$ takes a value between 0 and $2\pi$. FIG. 5B shows a line profile indicating a change in the phase value on the segment 501, which is calculated from FIG. 5A by expression (4) described above. As can be seen from FIG. 5B, the phase value repeats a value between 0 and $2\pi$ periodically.

The reference position pattern is created so that the step edge portion is located in a specific period of a plurality of periods in FIG. 5B. FIG. 5C is a line profile indicating a change in the pixel value on the segment 501 of the reference position pattern shown in FIG. 4D. As described above, in the line profile shown in FIG. 5C, the position of the step edge portion corresponds to the specific period in FIG. 5B.

Further, the position of the step edge portion in FIG. 5C is arranged in the vicinity of the center of the specific period as shown in FIG. 5B. Here, the position of the center of the period corresponds to the position at which the phase becomes π in a case in which, for example, the phase changes linearly from 0 to $2\pi$ with respect to the position as shown in FIG. 5B. It is not necessary for the position of the step edge portion of the reference position pattern to coincide, without exception, with the position at which the phase value becomes π and it may be possible to locate the step edge position at a position other than the period switch portion at which the phase becomes 0 or $2\pi$. Due to this, the effect is obtained that it is possible to robustly determine the period identification number against an error that occurs at the time of extracting the position of the step edge portion from a captured image in the processing at a period identification image generation step S1117, to be described later.

There is a possibility that the position (extraction position) of the step edge portion extracted from the captured image of the reference position pattern deviates due to the influence of noise, or the like, of the image capturing device. For example, in a case in which the amount of exposure for image capturing is overexposure at the time at which the reference position pattern is projected, there is a possibility that the bright portion of an image to be captured extends from the original position and the extraction position of the step edge portion deviates. Even in a case in which the extraction position deviates as described above, on a condition that the extraction position is located within the same period, the processing results at the period identification image generation step S1117, to be described later, are not changed. Consequently, by creating the reference position pattern so that the step edge portion is located in the middle of the period, processing robust against the above-described deviation of the extraction position is obtained. On the contrary, in a case in which the step edge portion is located originally in the vicinity of the period switch portion at which the phase is 0 or $2\pi$, there is a possibility that a different period identification image is generated for the deviation of the extraction position such as this, and, therefore, the processing becomes unstable. That is, in the present embodiment, by providing the step edge portion of the reference position pattern at a position other than the period switch portion at which the phase becomes 0 or $2\pi$, it is possible to generate a period identification image with a high accuracy even in a case in which the influence of noise, or the like, of the image capturing device is strong.

FIG. 4E shows a color acquisition pattern that is projected in order to acquire color information on the measurement-target object 101. In the present embodiment, a pattern having an entire surface that is uniformly white (pixel value 255) is employed, but the pattern is not limited to this pattern. For example, it may also be possible to change the pixel value in accordance with the position of the pixel so that the amount of light is uniform within the range of the measurement range 107 in a case in which a color acquisition pattern is projected onto the measurement-target object 101.

Exposure Condition

Figure 14:
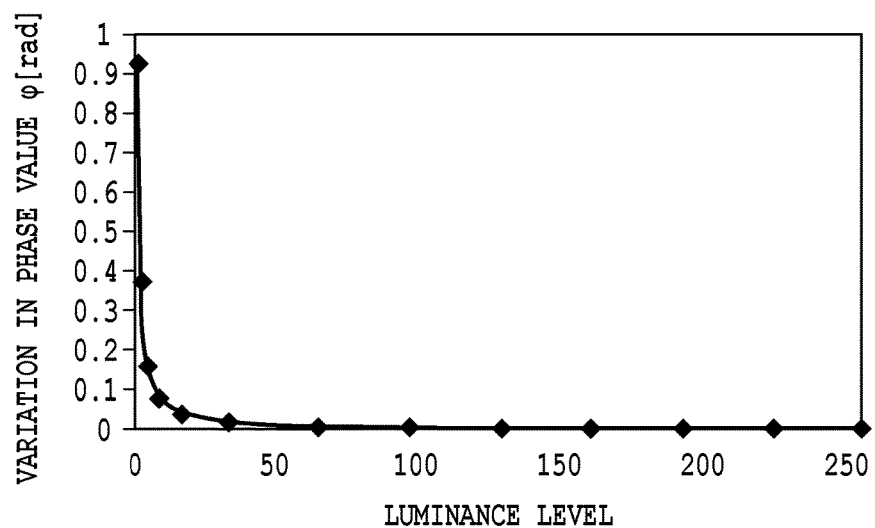
FIG. 14 is a diagram for explaining an influence of noise of an image capturing device in phase calculation.

In a case in which the measurement-target object 101 is a dark object having a high optical density, the contrast of a projected stripe pattern becomes low and it becomes difficult to distinguish the projected stripe pattern from noise applied in the image capturing devices 104 and 105, and, therefore, the accuracy of the calculation of the phase based on the image to be captured is reduced. FIG. 14 is a diagram showing a change in the standard deviation of the phase value in a case in which the normal distribution noise with a standard deviation of 0.4 is applied to a sinusoidal signal by which the minimum value of $I_0$, $I_1$, and $I_2$ shown in expression (4) is 0 and the maximum value is the luminance level of the horizontal axis. From FIG. 14, it is known that the phase value varies suddenly in a case in which the luminance level of the horizontal axis is low, i.e., in a case in which the contrast of the sinusoidal wave is low on a condition that the phase is calculated by expression (4). Because of the characteristics as described above, in order to measure a three-dimensional shape of the measurement-target object 101, it is necessary to use an image capturing device having low noise rather than measuring a color.

Consequently, in the present embodiment, for each of the stripe patterns in FIG. 4A to FIG. 4C, image capturing is performed a plurality of times with changed exposure settings of the image capturing device 104 and the image capturing device 105 and High Dynamic Range (HDR) combination is performed. Due to this, even in a case in which the measurement-target object 101 has a wide density distribution, like an oil painting, the influence of noise applied in the image capturing devices 104 and 105 is reduced, and, therefore, the accuracy of phase calculation improves.

FIG. 6 is a diagram for explaining exposure conditions in the present embodiment. In the present embodiment, exposure conditions in three steps are set to the image capturing device in a case in which the image of the stripe pattern is captured. That is, the exposure setting numbers 0 to 2 in FIG. 6 are exposure conditions for image capturing of the stripe pattern. Here, the exposure condition includes an f-stop, a shutter speed, and an ISO speed. The exposure setting number 3 is an exposure condition for image capturing of the reference position pattern and the exposure setting number 4 is an exposure condition for image capturing of the color acquisition pattern. As shown in FIG. 6, in the present embodiment, the image of the stripe pattern is captured under a plurality of exposure conditions and the image of the reference position pattern is captured under one exposure condition.

The exposure conditions as shown in FIG. 6 can be determined, for example, as follows. First, a white reference plate made up of magnesium oxide, barium sulfate, etc., is placed in place of the measurement-target object 101 and image capturing is performed by projecting the pattern having an entire surface that is white in FIG. 4E. At this time, the exposure condition under which the RGB values of the captured image are closest to predetermined values is taken to be the exposure condition for image capturing of the color acquisition pattern. Similarly, the exposure condition in which the amount of exposure is set to the maximum on a condition that the RGB values of the captured image do not saturate, i.e., the RGB values are values less than 65,535, which is the maximum value of 16 bits, is taken to be the exposure condition for image capturing of the reference position pattern.

As the exposure condition for image capturing of the stripe pattern, first, the same condition as the exposure condition for image capturing of the color acquisition pattern is set to the exposure setting number 1. Next, the exposure condition obtained by setting the Exposure Value (EV) to −3 step in the exposure setting number 1 is set to the exposure setting number 0 and similarly, the exposure condition obtained by setting the EV to +3 step in the exposure setting number 1 is set to the exposure setting number 2. It is desirable to set the exposure condition by fixing the f-stop and changing the shutter speed because changing the f-stop causes a geometric distortion to occur. There is a possibility, however, that the projection device 103 and the shutter speed interfere with each other and a flicker is caused. Consequently, in a case in which the frame rate of the projection device 103 is, for example, 1/30 sec, it is desirable to set the shutter speed to a speed longer than a reference value, which is 1/15 sec longer than 1/30 sec. That is, the exposure conditions are set by, first, setting the same f-stop and changing the shutter speed. Then, in a case in which the shutter speed is shorter than the reference value, it is desirable to set the shutter speed so as to become longer than the reference value by adjusting the International Organization for Standardization (ISO) speed.

The above-described exposure setting is exemplary and the exposure setting is not limited to this. It is desirable for the conditions of the exposure setting number 0 to the exposure setting number 2 to be determined appropriately in accordance with the density range of the measurement-target object 101 and the number of exposure conditions that are set at the time of capturing an image of the stripe pattern is not limited to three and may be two or five. Further, the exposure condition for image capturing of the reference position pattern may be the same as the exposure condition for image capturing of the color acquisition pattern and any exposure condition may be set as long as the position of the step edge portion described previously can be extracted from the captured image.

FIG. 7 is a diagram explaining the number of the captured image acquired by the image acquisition control unit 203 controlling the projection device 103, the image capturing device 104, and the image capturing device 105, the projected pattern at the time of image capturing, and the exposure condition. Here, it is assumed that the number of the captured image is the same as the captured image number in FIG. 7. The patterns with the projected pattern numbers 0 to 4 are the patterns shown in FIG. 4A to FIG. 4E, respectively. The exposure setting number means the exposure setting number in FIG. 6. As shown in FIG. 7, in the present embodiment, image capturing is performed 11 times, i.e., image capturing with the captured image numbers 0 to 10 is performed by the image capturing device 104 and the image capturing device 105.

Details of Image Acquisition Step

Figure 8:
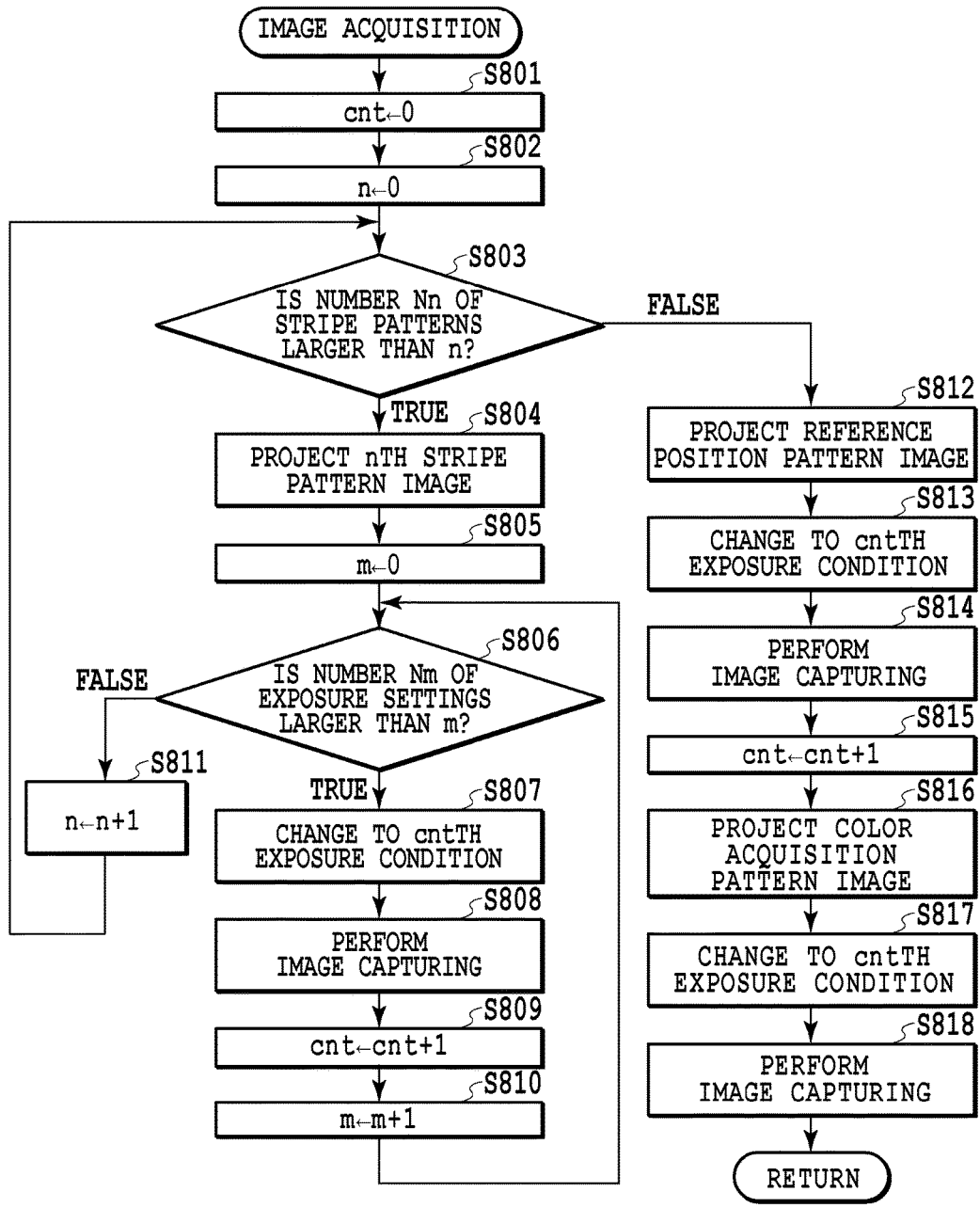
FIG. 8 is a flowchart showing a flow of detailed processing at an image acquisition step in the first embodiment.

FIG. 8 is a flowchart showing a flow of the detailed processing at the image acquisition step S302 performed by the image acquisition control unit 203 in the present embodiment. The processing at each step shown in FIG. 8 is implemented by the CPU reading a program stored in the HD, or the like, onto the RAM and executing the program. At step S801, the image acquisition control unit 203 initializes a variable cnt indicating the captured image number by 0. At step S802, the image acquisition control unit 203 initializes a variable n indicating the stripe pattern number by 0. Here, it is assumed that the stripe pattern number is the same as the projected pattern number in FIG. 7.

Next, at step S803, the image acquisition control unit 203 determines whether the variable n is smaller than a number Nn of stripe patterns. In the case where it is determined that the variable n is smaller than the number Nn of stripe patterns, the processing advances to step S804 and, in the other cases, the processing advances to step S812. In the present embodiment, as the stripe patterns, the three patterns shown in FIG. 4A to FIG. 4C exist, and therefore, the number Nn of stripe patterns=3. At S804, the image acquisition control unit 203 performs control so that the projection device 103 projects the projected pattern with the projected pattern number indicated by the variable n onto the measurement-target object 101. At step S805, the image acquisition control unit 203 initializes a variable m indicating the exposure setting number by 0. At step S806, the image acquisition control unit 203 determines whether the variable m is less than a number Nm of exposure settings. In a case in which it is determined that the variable m is less than the number Nm of exposure settings, the processing advances to step S807 and, in the other cases, the processing advances to step S811. Here, the number Nm of exposure settings is the number of exposure conditions under which the image of the stripe pattern is captured and in the present embodiment, image capturing is performed under the exposure conditions in the three steps, and, therefore, Nm=3.

At step S807, the image acquisition control unit 203 reads the exposure setting number corresponding to the captured image number indicated by the variable cnt from FIG. 7. The image acquisition control unit 203 refers to FIG. 6 with the read exposure setting number and sets the corresponding f-stop, shutter speed, and ISO speed to the image capturing device 104 and the image capturing device 105. At step S808, the image acquisition control unit 203 performs control so that the image capturing device 104 and the image capturing device 105 capture the image of the measurement-target object. Specifically, the image acquisition control unit 203 sends a command to start image capturing to the image capturing device 104 and the image capturing device 105 and acquires the images captured by each of the image capturing devices and stores the captured images in a storage medium, such as the HD, not shown schematically. Next, at step S809 and step S810, the image acquisition control unit 203 adds 1 to the variable cnt indicating the captured image number and the variable m indicating the exposure setting number and returns the processing to step S806. In a case in which the processing at steps S807 to S810 is repeated the number of times corresponding to the number Nm of exposure settings, it is determined that the variable m has reached the number Nm of exposure settings at step S806 and the processing advances to step S811. At step S811, the image acquisition control unit 203 adds 1 to the variable n indicating the stripe pattern number and returns the processing to step S803.

By repeating the processing at steps S803 to S811 as described above, image capturing is performed the number of times corresponding to the number of exposure settings for all the stripe patterns. In the present embodiment, the number Nn of stripe patterns is three and the number Nm of exposure settings is three, and, therefore, the image capturing step S808 is performed three×three times, i.e., nine times.

Next, in the case where the processing advances to step S812 in accordance with the determination at step S803, the image acquisition control unit 203 projects the reference position pattern in FIG. 4D onto the measurement-target object 101 at step S812 as at step 804. Then, the image acquisition control unit 203 changes the exposure condition at step S813 and performs image capturing at step S814, respectively, as at steps S807 and S808. After this, the image acquisition control unit 203 adds 1 to the variable cnt at step S815, projects the color acquisition pattern in FIG. 4E onto the measurement-target object 101 at step S816 as at step S804, changes the exposure condition and performs image capturing at step S817 and step S818 as at step S807 and step S808, and terminates the processing.

Details of Shape Calculation Unit

Figure 9:
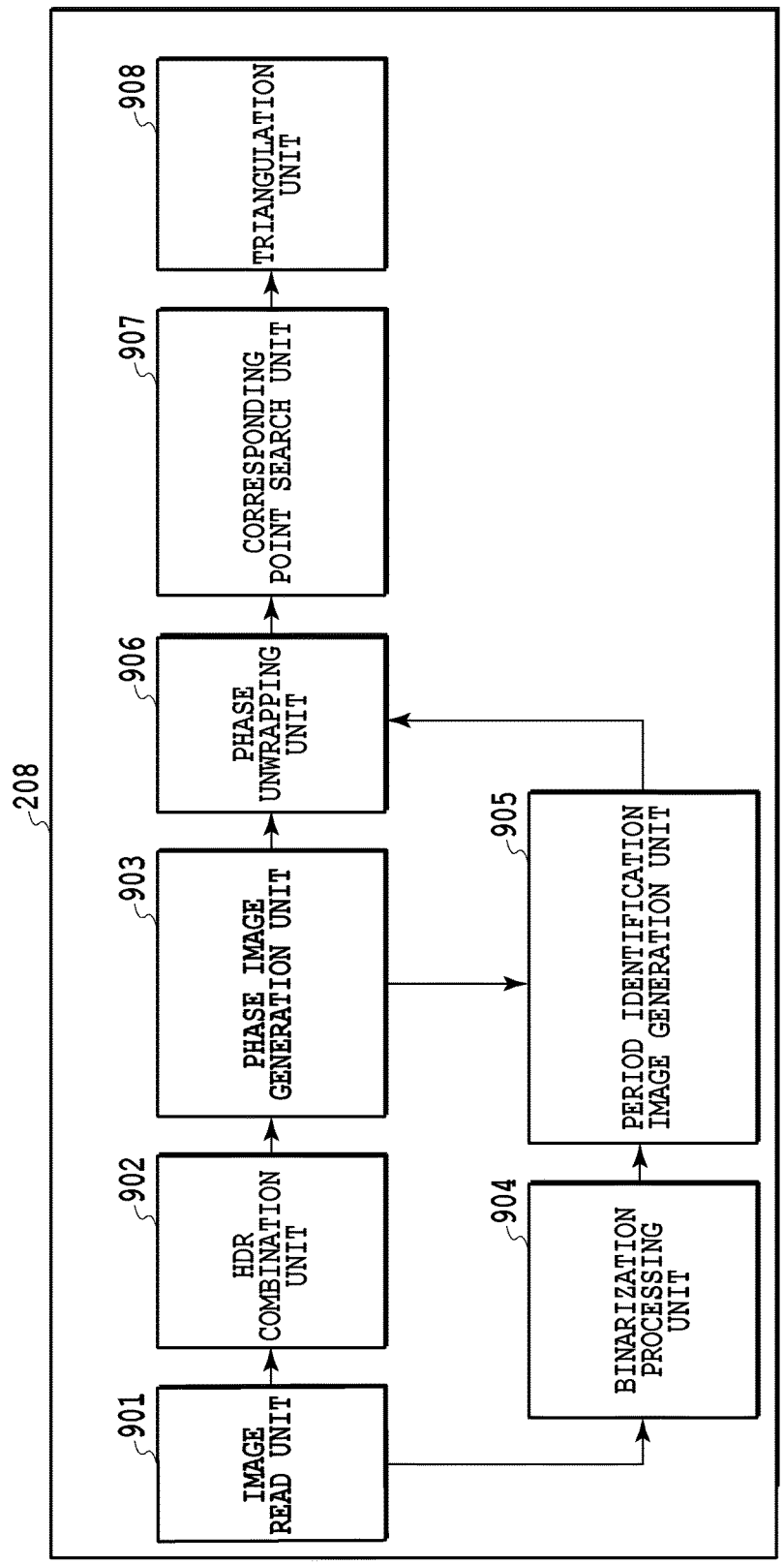
FIG. 9 is a block diagram showing a detailed function configuration of a shape calculation unit in the first embodiment.

FIG. 9 is a block diagram explaining a more detailed function configuration of the shape calculation unit 205 configured to perform the shape calculation step S303. An image read unit 901 reads captured images captured by the image capturing device 104 and the image capturing device 105 and stored in a storage medium, such as the HD, in accordance with the necessity.

An HDR combination unit 902 performs HDR combination of images captured under a plurality of different exposure conditions for each stripe pattern and generates one combined image of higher quality than that of the captured images. As HDR combination processing, a variety of methods are known already. For example, in a case in which an image 1 captured under a condition that the amount of exposure is small and an image 2 captured under a condition that the amount of exposure is large are combined, first, each coefficient by which each of RGB values of the image 2 is multiplied is determined so that average RGB values in a predetermined area become equal. Then, the RGB values after combination are obtained by weighted-averaging the RGB values of the image 2, which are multiplied by the determined coefficients, and the RGB values of the image 1 for each of the RGB channels. At this time, by performing the weighted-averaging so that the smaller the value, the heavier the weight of the image 2 for each of the RGB channels, it is possible to acquire an image after combination in which noise at a dark portion of the image 1 has been reduced.

In the present embodiment, first, the image captured by the image capturing device 104 with the captured image number 0 shown in FIG. 7 is taken to be the image 1 and the image captured by the image capturing device 104 with the captured image number 1 is taken to be the image 2 and then the HDR combination processing is performed. Then, the image after the combination is taken to be the image 1 and the image captured by the image capturing device 104 with the captured image number 2 is taken to be the image 2 and the same processing is performed again and an image for which the HDR combination of the three images has been performed is acquired. As described above, in the HDR combination unit 902, the HDR combination is performed for images captured by the image capturing device 104 with the captured image numbers 0 to 2, images captured by the image capturing device 104 with the captured image numbers 3 to 5, and images captured by the image capturing device 104 with the captured image numbers 6 to 8, respectively. Similarly, the HDR combination is performed for images captured by the image capturing device 105 with the captured image numbers 0 to 2, images captured by the image capturing device 105 with the captured image numbers 3 to 5, and images captured by the image capturing device 105 with the captured image numbers 6 to 8, respectively. That is, six combined images in all are generated.

A phase image generation unit 903 generates a phase image by calculating the phase of each pixel in accordance with expression (4) from the three combined images of the image capturing device 104 of the six combined images in all generated by the HDR combination unit 902. At this time, it may also be possible to calculate the phase by using only the G channel of the combined image or to calculate the phase by using luminance information obtained by adding each channel of R, G, and B with a predetermined weight. Further, the phase image is image data in which each channel of each pixel is represented by a 32-bit floating point number that takes a value between 0 to $2\pi$, but the phase image is not limited to this. Similarly, the phase image generation unit 903 generates a phase image by calculating the phase of each pixel in accordance with expression (4) also for the three images captured by the image capturing device 105. The phase image generated for each image capturing device is stored in a storage medium, such as the RAM, not shown schematically.

A binarization processing unit 904 generates a binarized image of the reference position pattern by performing binarization processing of the image (captured image of the reference position pattern) captured by the image capturing device 104 and the image captured by the image capturing device 105 with the captured image number 9 in FIG. 7. The binarization processing is processing to generate an image in which each channel of each pixel is represented by eight bits, whose pixel value is 0 in a case in which the luminance information obtained by adding each channel of R, G, and B with a predetermined weight is less than a predetermined threshold value in each pixel of the captured image and whose pixel value is 255 in the other cases. The generated binarized image is stored in a storage medium, such as the RAM.

Further, it is also possible to perform binarization processing with a higher accuracy by using an image whose entire surface is white obtained by projecting a projected pattern having an entire surface that is uniformly white and capturing the image of the pattern under the same exposure condition and an image having an entire surface that is black obtained by projecting a projected pattern having an entire surface that is uniformly black and capturing the image of the pattern under the same exposure condition. That is, by comparing the captured image of the reference position pattern with the image having an entire surface that is white and the image having an entire surface that is black, the binarization processing of the captured image of the reference position pattern is performed. In this case, by calculating a difference 1 from the luminance information on the image having an entire surface that is black and a difference 2 from the luminance information on the image having an entire surface that is white, respectively, for each pixel, it is possible to determine the pixel value so as to be 0 in a case in which the absolute value of the difference 1 is less than the absolute value of the difference 2, and so as to be 255 in the other cases. The method of binarization processing is not limited only to the method described here. Here, the binarization processing unit 904 is shown as a processing unit separate from a period identification image generation unit 905, to be described later, but it may also be possible to design a configuration in which the binarization processing unit 904 is included in the period identification image generation unit 905.

The period identification image generation unit 905 generates a period identification image based on the phase images of the image capturing device 104 and the image capturing device 105 generated by the phase image generation unit 903 and the binarized images of the reference position pattern of the image capturing device 104 and the image capturing device 105 generated by the binarization processing unit 904. Although details of this processing will be described later, the period identification image is an image in which the number of the period of the phase is allocated in each pixel of the phase image and the period identification image is stored in the RAM, or the like, as, for example, an image in which each channel corresponding to each pixel of the phase image is represented by eight bits.

Figure 10A:
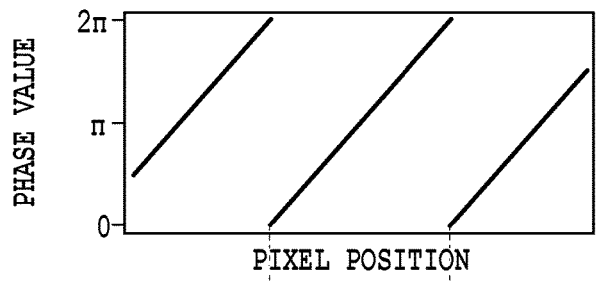
FIG. 10A to FIG. 10D are diagrams for explaining a period identification image in the first embodiment.
Figure 10B:
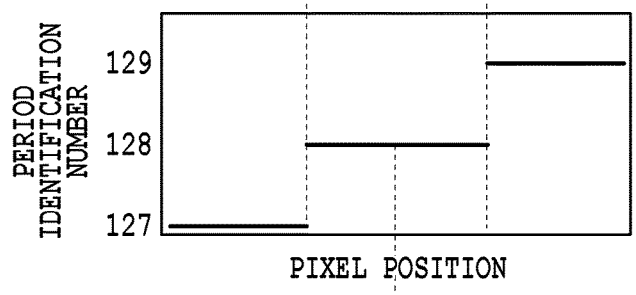
Figure 10C:
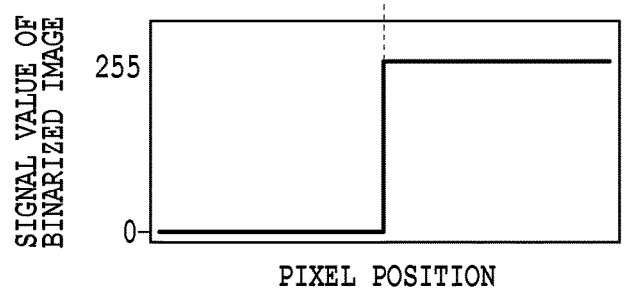

FIG. 10A to FIG. 10D are diagrams for explaining a period identification image. FIG. 10A is a line profile showing a relationship between the pixel position and the phase value on a line (line perpendicular to the stripe) of the phase image. As shown in FIG. 10A, the phase value repeats a value between 0 and $2\pi$ periodically. A line profile of the period identification image shown in FIG. 10B is obtained by allocating consecutive numbers from the left to each period. At this time, the period identification number of each pixel position in FIG. 10B is determined so that the period identification number corresponding to the position of the edge portion at which the value changes is a predetermined number (in the case of the present embodiment, 128) in a line profile of a binarized image shown in FIG. 10C. In this manner, the period identification number is determined for all the pixels of the phase image and thereby, a period identification image is generated.

The period identification image is used in the phase unwrapping processing, to be described later. Further, the above-described predetermined number is common between the image capturing devices, and, therefore, by performing the phase unwrapping processing using the period identification images generated as described above, it is possible to generate an unwrapped phase image for which matching has been taken between the phase images of the image capturing devices. Due to this, the phase at a point on the measurement-target object 101 is the same between the unwrapped phase images generated by the image capturing device 104 and the image capturing device 105, respectively, and, therefore, a corresponding point search, to be described later, is enabled.

A phase unwrapping unit 906 generates an unwrapped phase image in which repetition does not take place for each period based on the period identification image and the phase image. This processing can be represented by expression (5) below in a case in which the pixel value of the unwrapped phase image is taken to be $\Phi Dc$ (j, i), the pixel value of the period identification image is taken to be P (j, i), and the pixel value of the phase image is taken to be $\Phi$ (j, i).

$$\Phi_c(j,i)=\Phi(j,i)+2\pi P(j,i) \tag{5}$$

Figure 10D:
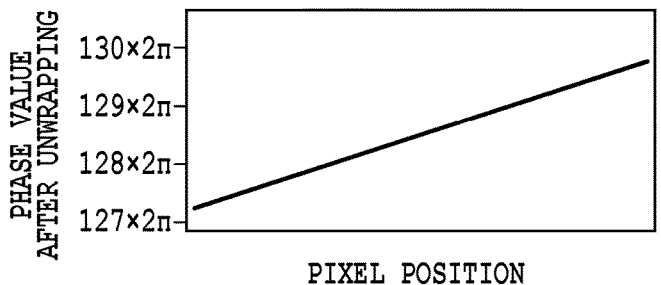

The unwrapped phase image is image data in which each channel of each pixel is represented by a 32-bit floating point number, and generated for each of the image capturing device 104 and the image capturing device 105 and stored in a storage medium, such as the RAM, respectively. FIG. 10D is a diagram showing an example of the results of the phase unwrapping processing and shows a line profile of the unwrapped phase image generated based on the line profile of the phase image shown in FIG. 10A and the line profile of the period identification image shown in FIG. 10B.

A corresponding point search unit 907 calculates the position of a pixel of the unwrapped phase image of the image capturing device 105, at which the phase value is the same, for each pixel of the unwrapped phase image of the image capturing device 104. Specifically, first, a 3×3 fundamental matrix F is calculated in advance from a relationship in the attitude and position between the image capturing device 104 and the image capturing device 105 and an epi-polar line is calculated from a relationship of expression (6) below.

$$[u' \ v' \ 1] F \begin{bmatrix} u \\ v \\ 1 \end{bmatrix} = 0 \quad (6)$$

Here, (u, v) is two-dimensional coordinates indicating the position of a pixel of the unwrapped phase image of the image capturing device 104. Further, (u', v') is two-dimensional coordinates indicating the position of a pixel of the unwrapped phase image of the image capturing device 105. The corresponding point search unit 907 uniquely determines an equation (equation of a straight line) representing an epi-polar line that passes through the coordinates (u', v') for arbitrary coordinates (u, v) by expression (6). Then, the corresponding point search unit 907 searches for a pixel having a pixel value equal to the pixel value at the coordinates (u, v) in the unwrapped phase image of the image capturing device 104 in the unwrapped phase image of the image capturing device 105 along the above-described straight line represented by the equation. The corresponding point search unit 907 stores the coordinates (u', v') of the position searched for in the RAM, or the like. This corresponding point search processing is performed for all the pixels in the unwrapped phase image of the image capturing device 104.

The corresponding point search processing performed by the corresponding point search unit 907 is not limited to the above-described processing. For example, it may also be possible to calculate similarity of a pixel in a predetermined area by a block matching method or the like and to record the coordinates (u', v') in the unwrapped phase image of the image capturing device 105, at which the similarity to the coordinates (u, v) in the unwrapped phase image of the image capturing device 104 becomes the maximum.

A triangulation unit 908 calculates three-dimensional coordinates (X, Y, Z) of a measurement point on the measurement-target object 101 from the coordinates (u, v) in the unwrapped phase image of the image capturing device 104 and the coordinates (u', v') in the unwrapped phase image of the image capturing device 105, which correspond to the coordinates (u, v). Specifically, 3×4 projection matrices P and P' represented by expressions (7) and (8) below are calculated in advance from the focal length, position, and attitude of the image capturing device 104 and the image capturing device 105 and simultaneous equations including expression (7) and expression (8) are solved for (X, Y, Z).

$$\begin{bmatrix} u \\ v \\ 1 \end{bmatrix} = P \begin{bmatrix} X \\ Y \\ Z \\ 1 \end{bmatrix} \quad (7)$$

$$\begin{bmatrix} u' \\ v' \\ 1 \end{bmatrix} = P' \begin{bmatrix} X \\ Y \\ Z \\ 1 \end{bmatrix} \quad (8)$$

Solving the simultaneous equations is equivalent to solving expression (9) below in a case in which it is assumed that the element in the mth row and nth column of the matrix P is represented by Pmn and the element in the mth row and nth column of the matrix P' is represented by P'mn.

$$\begin{bmatrix} uP_{31} - P_{11} & uP_{32} - P_{12} & uP_{33} - P_{13} \\ vP_{31} - P_{21} & vP_{32} - P_{22} & vP_{33} - P_{23} \\ u'P'_{31} - P'_{11} & u'P'_{32} - P'_{12} & u'P'_{33} - P'_{13} \\ v'P'_{31} - P'_{21} & v'P'_{32} - P'_{22} & v'P'_{33} - P'_{23} \end{bmatrix} \begin{bmatrix} X \\ Y \\ Z \end{bmatrix} = \begin{bmatrix} uP_{34} - P_{14} \\ vP_{34} - P_{24} \\ u'P'_{34} - P'_{14} \\ v'P'_{34} - P'_{24} \end{bmatrix} \quad (9)$$

The triangulation unit 908 sequentially calculates the three-dimensional coordinates (X, Y, Z) for all the pixels of the unwrapped phase image of the image capturing device 104 in accordance with expression (9) and generates point group information in which the three-dimensional coordinates (X, Y, Z) are recorded by 32-bit floating point numbers for each of the three channels of XYZ and the point group information is stored in a storage medium, such as the HD.

Details of Shape Calculation Step

Figure 11A:
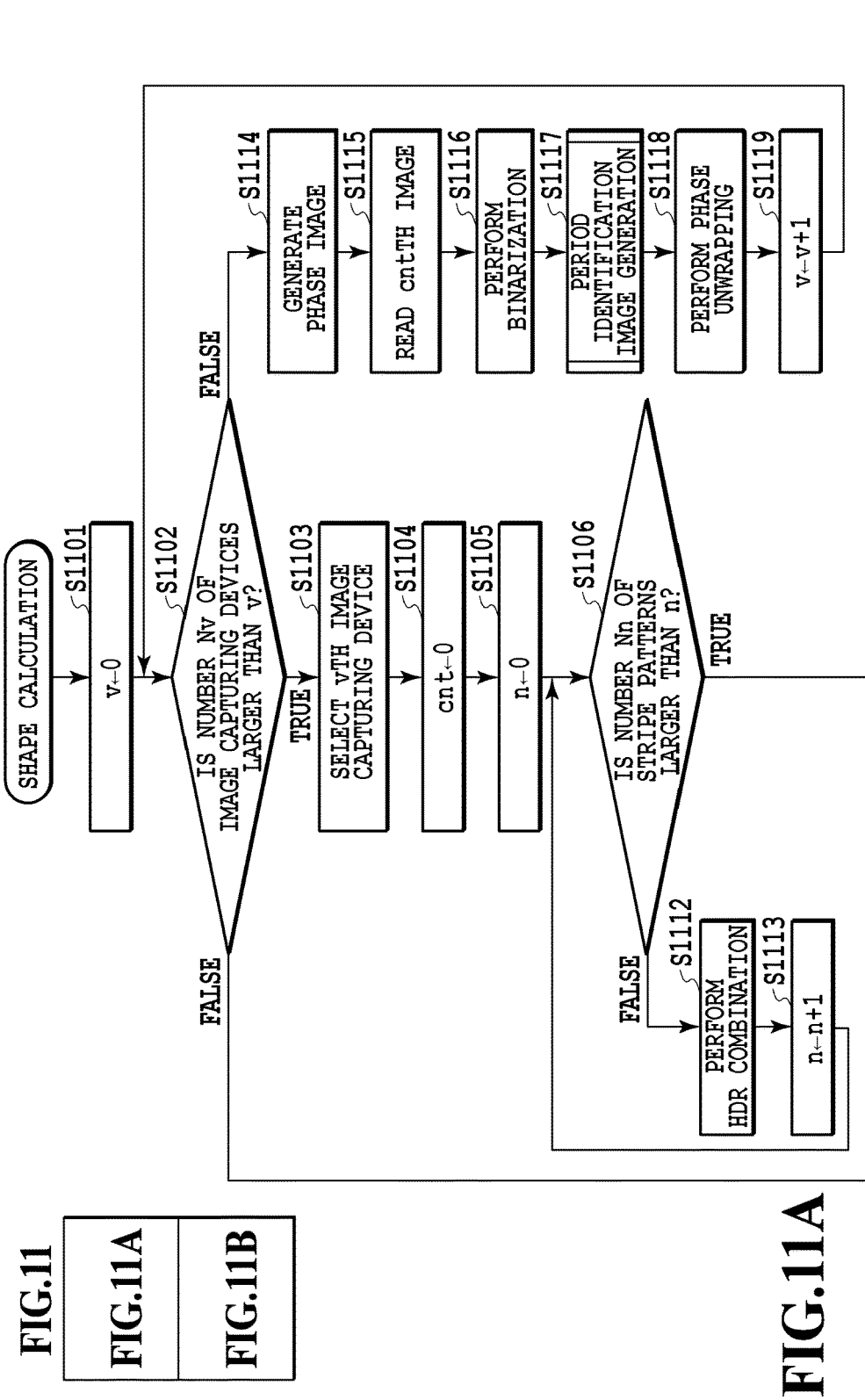
FIG. 11A is a flowchart showing a flow of detailed processing at a shape calculation step in the first embodiment.
Figure 11B:
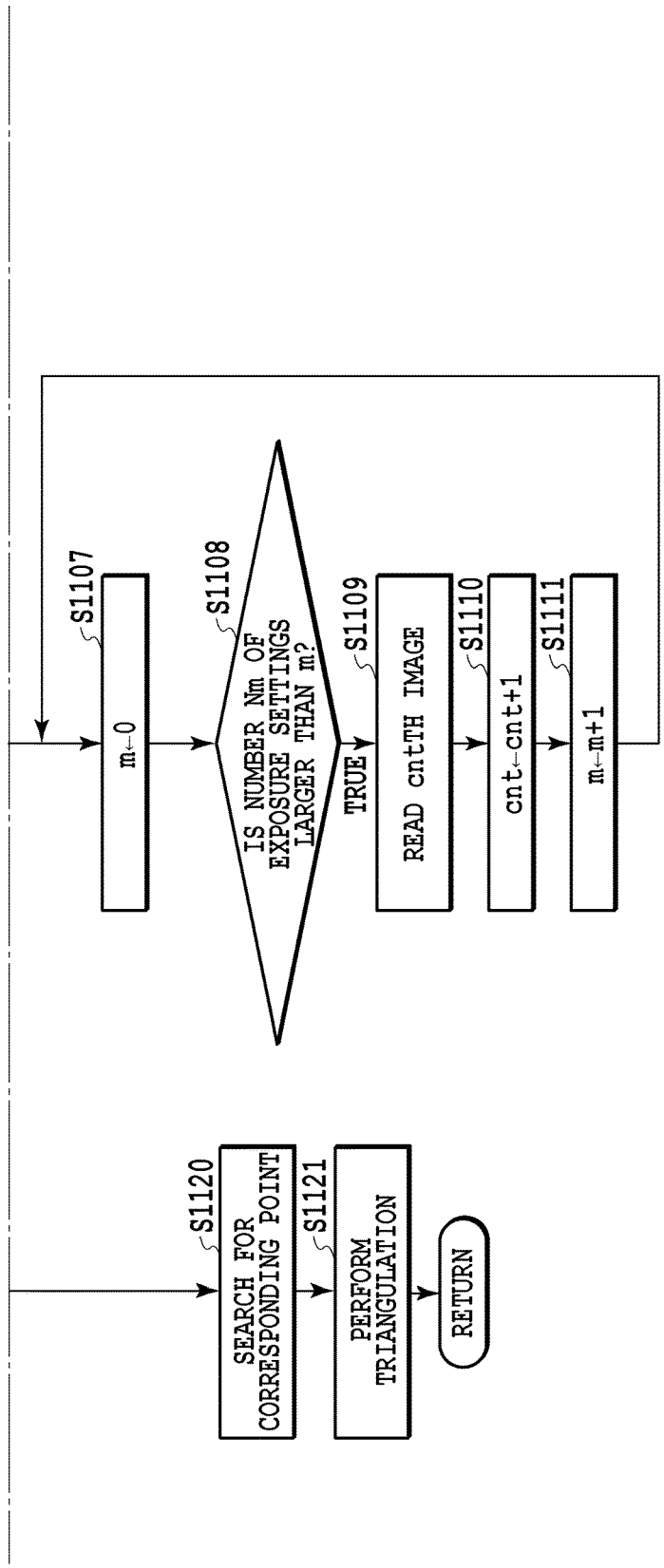
FIG. 11B is a flowchart showing a flow of detailed processing at a shape calculation step in the first embodiment.

FIG. 11A and FIG. 11B are flowcharts showing a flow of the detailed processing at the shape calculation step S303 performed by the shape calculation unit 205 in the present embodiment. The processing at each step shown in FIG. 11A and FIG. 11B is implemented by the CPU reading a program stored in the HD or the like onto the RAM and executing the program. First, at step S1101, the image read unit 901 initializes a variable v indicating the image capturing device number by 0. In the present embodiment, v=0 is the number of the image capturing device 104 and v=1 is the number of the image capturing device 105.

Next, at step S1102, the image read unit 901 determines whether the variable v is less than a number Nv of image capturing devices. In the present embodiment, the number Nv of image capturing devices=2. In a case in which it is determined that the variable v is less than the number Nv of image capturing devices, the processing advances to S1103 and, in the other cases, the processing advances to step S1120. At step S1103, the image read unit 901 selects the with image capturing device. In accordance with the selection processing at this step, instructions to read which of the images captured by the image capturing device 104 and the image capturing device 105 in the subsequent processing are given. That is, in a case in which v=0, the image captured by the image capturing device 104 is read in the subsequent processing and, in a case in which v=1, the image captured by the image capturing device 105 is read in the subsequent processing.

At step S1104, the image read unit 901 initializes the variable cnt indicating the captured image number by 0. At step S1105, the image read unit 901 initializes the variable n indicating the projected pattern number by 0. Next, at step S1106, the image read unit 901 determines whether the variable n is less than the number Nn of stripe patterns. In the present embodiment, the number Nn of stripe patterns is three as described already. In a case in which it is determined that the variable n is less than the number Nn of stripe patterns, the processing advances to step S1107 and, in the other cases, the processing advances to step S1114. At step S1107, the image read unit 901 initializes the variable m indicating the exposure setting number by 0.

At step S1108, the image read unit 901 determines whether the variable m is less than the number Nm of exposure settings. In a case in which it is determined that the variable m is less than the number Nm of exposure settings, the processing advances to step S1109 and, in the other cases, the processing advances to step S1112. At step S1109, the image read unit 901 reads the image captured by the image capturing device specified by the variable v with the captured image number indicated by the variable cnt. Then, at steps S1110 and S1111, the image read unit 901 adds 1 to the variable cnt indicating the captured image number and to the variable m indicting the exposure setting number, respectively, and returns the processing to step S1108.

After the processing at steps S1109 to S1111 is repeated the number of times corresponding to the number Nm of exposure settings, it is determined that the variable m has reached the number Nm of exposure settings at step S1108 and the processing advances to step S1112. At step S1112, the HDR combination unit 902 performs HDR combination of the Nm captured images read in the loop of steps S1108 to S1111 and generates one combined image. Then, at step S1113, the image read unit 901 adds 1 to the variable n and returns the processing to step S1106. A case in which the processing advances to step S1114 in accordance with the results of the determination at step S1106 means that the image (combined image) after the HDR combination has been generated for all the stripe patterns at step S1112. At step S1114, the phase image generation unit 903 generates the phase image by using the combined images.

Next, at step S1115, the image read unit 901 reads the image captured at the time at which the reference position pattern is projected, which corresponds to the captured image number 9 in FIG. 7. At step S1116, the binarization processing unit 904 binarizes the captured image of the reference position pattern read at step S1115 and generates a binarized image of the reference position pattern. Then, at step S1117, the period identification image generation unit 905 generates a period identification image based on the binarized image of the reference position pattern generated at step S1116 and the phase image generated at step S1114. Details of the period identification image generation step S1117 will be described later.

After this, at step S1118, the phase unwrapping unit 906 generates an unwrapped phase image based on the period identification image generated at step S1117 and the phase image generated at step S1114. That is, the phase unwrapping unit 906 generates an unwrapped phase image by calculating the phase value after unwrapping of each pixel in accordance with expression (5). Then, at step S1119, the image read unit 901 adds 1 to the variable v and returns the processing to step S1102. After the unwrapped phase image is generated for all the image capturing devices by the processing at steps S1103 to S1119, it is determined that the variable v has reached the number Nv of image capturing devices at step S1120 and the processing advances to step S1120. Then, at step S1120, the corresponding point search unit 907 searches for a corresponding point at which the phase value is the same between the unwrapped phase images of the different image capturing devices. At step S1121, the triangulation unit 908 calculates a three-dimensional shape of the measurement-target object by using the principle of triangulation based on the coordinates of the corresponding point.

Details of Period Identification Image Generation Step

Figure 12A:
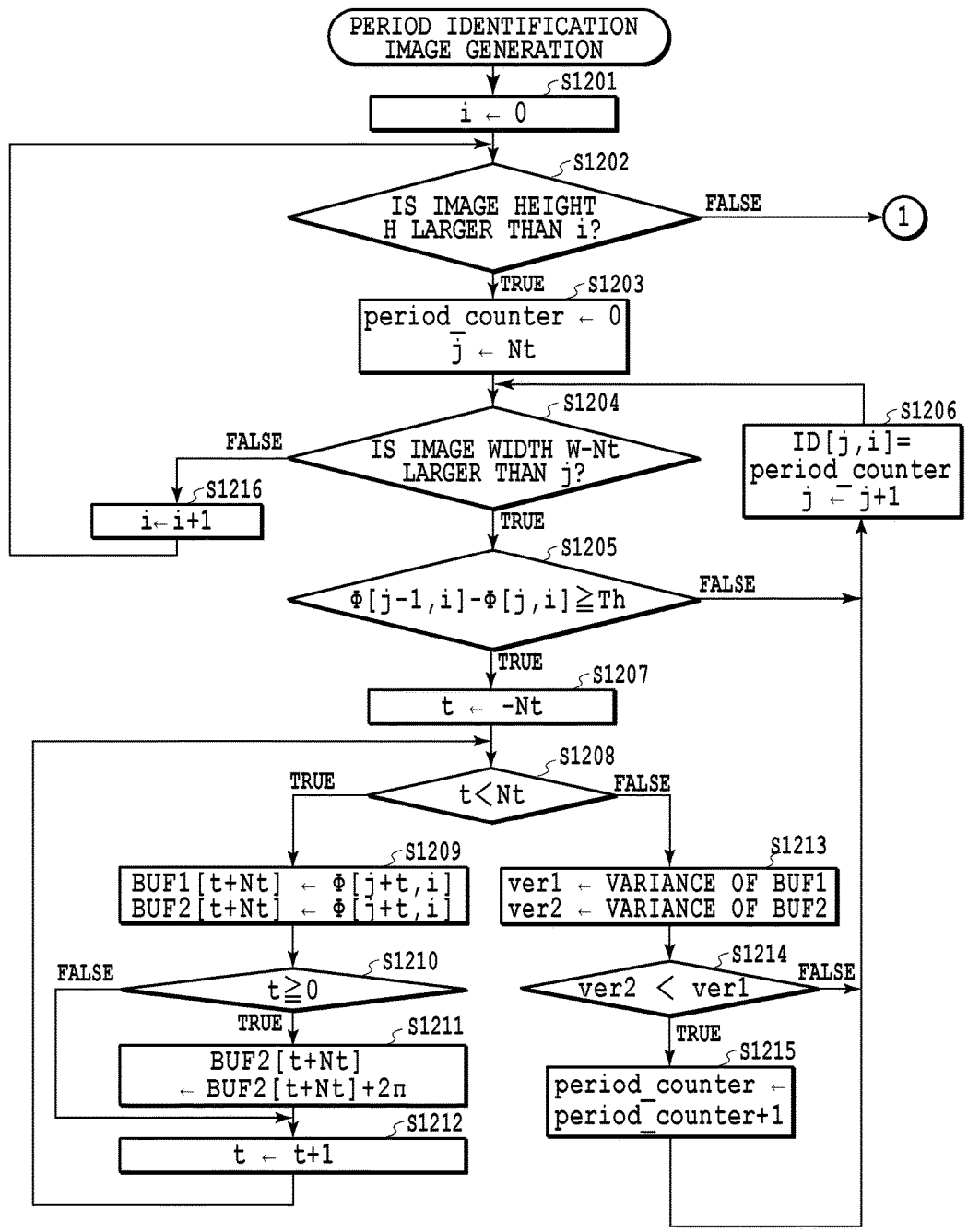
FIG. 12A and FIG. 12B are a flowchart showing a flow of detailed processing at a period identification image generation step in the first embodiment.
Figure 12B:
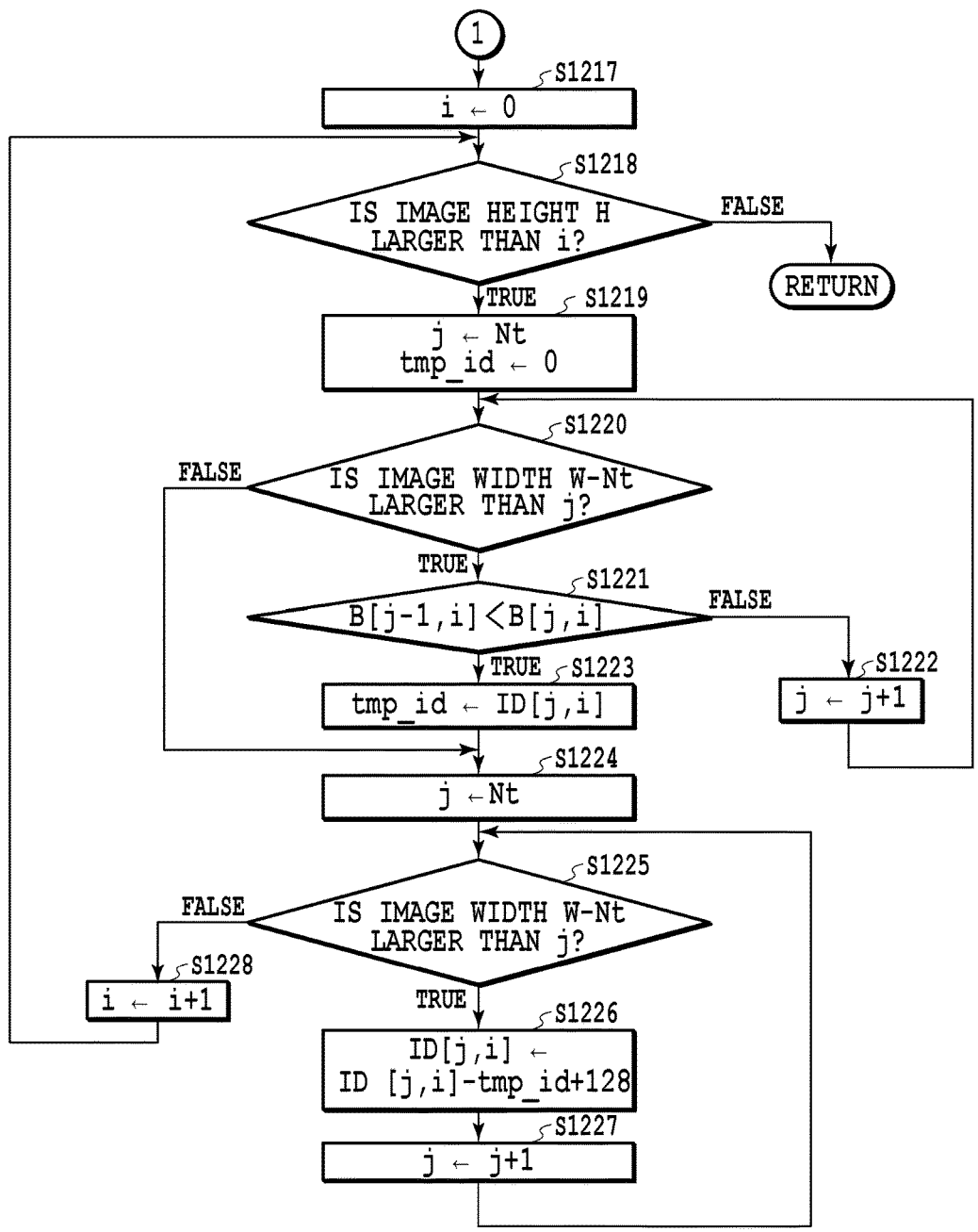

In the present embodiment, the period identification image is generated based on the binarized image of the reference position pattern and the phase image. FIG. 12A and FIG. 12B are a flowchart showing a flow of the detailed processing at the period identification image generation step S1117 performed by the period identification image generation unit 905 in the present embodiment. The processing at each step shown in FIG. 12A and FIG. 12B is implemented by the CPU reading a program stored in the HD, or the like, onto the RAM and executing the program.

The processing at steps S1201 to S1216 is processing (number initialization processing) to identify and to count the period switch portion for each line for the phase image and to initialize the pixel value (period identification number) of the period identification image by the count value. First, at step S1201, the period identification image generation unit 905 initializes a variable i indicating the position in the height direction of a pixel by 0. At step S1202, the period identification image generation unit 905 determines whether or not the number initialization processing has been completed for all the lines of the phase image by determining whether or not the variable i is less than a height H of the image. In a case in which the variable i is less than the height H, the processing advances to step S1203 so that the number initialization processing of the ith line is performed and, in the other cases, it is determined that the number initialization processing of all the lines has been completed and the processing advances to step S1217. In the present embodiment, from the number of pixels of the area sensors of the image capturing devices 104 and 105, the height H of the image is 5,792.

At step S1203, the period identification image generation unit 905 initializes a variable period_counter to count the period switch portion in the ith line of the phase image by 0 and initializes a variable j indicating the position in the width direction of a pixel by Nt. Here, Nt is a parameter to specify the position range of a pixel that is referred to at the time of determining the period switch portion from the phase image, and is a natural number. That is, in order to determine whether or not the pixel at a position (j, i) of the phase image is the period switch portion, the pixels at a position (j −Nt, i) to a position (j+Nt −1, i) are referred to.

At step S1204, the period identification image generation unit 905 determines whether or not the processing of one line of the image has been completed by determining whether or not the variable j is less than an image width W −Nt. In a case in which the variable j is less than the image width W −Nt, it is determined that the processing of one line has not been completed and the processing advances to step S1205. In the other cases, it is determined that the processing of one line has been completed and the processing advances to step S1216. In the present embodiment, from the number of pixels of the area sensors of the image capturing devices 104 and 105, the image width W is 8,688.

At step S1205, the period identification image generation unit 905 calculates a difference $\Phi(j −1, i)−\Phi(j, i)$ between the value of the adjacent pixel and the value of the pixel of interest in a phase image $\Phi$ generated at step S1114 and determines whether or not the difference is greater than or equal to a threshold value Th set in advance. As shown in FIG. 10A, at the period switch portion, the phase value changes considerably. At step S1205, in a case in which it is determined that the difference in the phase value is greater than or equal to the threshold value Th, the portion at which the phase value changes considerably is taken to be a candidate of the period switch portion and the processing is advanced to step S1207. In the other case, it is determined that the pixel located at the position (j, i) of the phase image is not the period switch portion and the processing is advanced to step S1206. At step S1206, the period identification image generation unit 905 records the value of the variable period_counter in a pixel value ID (j, i) of the period identification image and adds 1 to j and returns the processing to step S1204.

In the processing at steps S1207 to S1215, the peripheral pixels of the pixel, which is a candidate of the period switch portion, are taken into consideration, and whether or not performing period switching at the pixel is appropriate is determined. Specifically, at steps S1207, the period identification image generation unit 905 initializes a variable t to refer to the peripheral pixels by −Nt. Then, at step S1208, the period identification image generation unit 905 determines whether or not reference to the peripheral pixels has been completed by determining whether or not the variable t is less than Nt. In a case in which the variable t is less than Nt, it is determined that the reference has not been completed and the processing advances to step S1209 and, in the other cases, it is determined that the reference has been completed and the processing advances to step S1213. At step S1209, the value of (I) (j+t, i) is saved sequentially in buffer memories BUF1 and BUF2 each having a size of 2×Nt. At steps S1210 and S1211, in a case in which t is greater than or equal to 0, 2π is added to the value of the BUF2. Then, at step S1212, 1 is added to the variable t and the processing is returned to step S1208.

By the loop of steps S1208 to S1212, the phase values of the peripheral pixels of the pixel of interest before phase unwrapping are stored in the BUF1 and values corresponding to the phase values of the peripheral pixels of the pixel of interest after phase unwrapping are stored in the BUF2. Next, at step S1213, the variances of the data recorded in the BUF1 and BUF2 are calculated, respectively. In a case in which the pixel of interest is appropriate as the period switch portion, the variance of the BUF2 is less than the variance of the BUF1 and, in the other cases, the variance of the BUF1 is less than the variance of the BUF2. Consequently, at step S1214, whether or not the variance of the BUF2 is less than the variance of the BUF1 is determined and, in a case in which it is determined that the variance of the BUF2 is less than the variance of the BUF1, the pixel of interest is taken to be the period switch portion and the processing is advanced to step S1215. At step S1215, 1 is added to the variable period_counter to count the period switch portion and the processing is advanced to step S1206. At step S1206, as described previously, the value of the variable period_counter is recorded in the pixel value ID (j, i) of the period identification image and 1 is added to j and the processing is returned to step S1204.

As described above, by determining the appropriateness of the period switch portion, it is possible to generate a period identification image with a high accuracy even in a case in which the influence of noise, or the like, of the image capturing device is strong. Here, the appropriateness of the period switch portion is determined by the variance, but the invention is not limited to such a determination. For example, it may also be possible to use an error at the time of performing linear regression in place of the variance. On the completion of the number initialization processing of the ith line, the processing advances to step S1216. At step S1216, 1 is added to the variable i and the processing is returned to step S1202. On the completion of the number initialization processing for all the lines of the phase image, i.e., in a case in which the pixel value has been initialized in all the pixels of the period identification image ID, the processing is branched into step S1217 at S1202.

The processing at steps S1217 to S1228 is processing to extract the position of the step edge portion from the binarized image of the reference position pattern generated at step S1116 and to modify the pixel value of the period identification image so that the period identification number corresponding to the position becomes a predetermined number common between the image capturing devices. By the processing such as this, it is guaranteed that the phase value after phase unwrapping at a certain point on the measurement-target object 101 is the same between the different image capturing devices. First, at step S1217, the period identification image generation unit 905 initializes the variable i indicating the position in the height direction of a pixel by 0. Next, at step S1218, whether or not the variable i is less than the height H of the image is determined. In a case in which the variable i is less than the height H of the image, the processing advances to step S1219 so that the pixel value of the ith line of the period identification image is modified and, in the other cases, it is determined that the modification of the pixel value of all the lines of the period identification image has been completed and the processing ends.

At step S1219, the period identification image generation unit 905 initializes a variable tmp_id to store the period identification number before modification corresponding to the position of the step edge portion and the variable j indicating the position in the width direction of a pixel by 0, respectively. At step S1220, the period identification image generation unit 905 determines whether or not the processing of one line of the image has been completed by determining whether or not the variable j is less than the image width W−Nt. In a case in which the variable j is less than the image width W−Nt, it is determined that the processing of one line has not been completed and the processing is advanced to step S1221. In the other cases, it is determined that the processing of one line has been completed and the processing is advanced to step S1224.

At step S1221, the period identification image generation unit 905 determines whether or not the value of the adjacent pixel is different from the value of the pixel of interest in the binarized image generated at step S1116. In a case in which the value of the adjacent pixel is the same as that of the pixel of interest, it is determined that the pixel of interest is not the step edge portion and 1 is added to the variable j at S1222 and the processing is returned to S1220. In a case in which the value of the adjacent pixel is different from that of the pixel of interest, it is determined that the pixel of interest is the step edge portion and the pixel value ID (j, i) of the period identification image at this time is stored in the variable tmp_id at step S1223 and the processing is advanced to step S1224.

In the processing at steps S1224 to S1227, the value of each pixel of the ith line of the period identification image is modified. First, the variable j indicating the position in the width direction of a pixel is initialized again at step S1224 and whether or not the processing of one line has been completed is determined at step S1225. In a case in which it is determined that the processing of one line has been completed, the processing is advanced to step S1228 and the above-described processing is performed repeatedly for the next line by adding 1 to the variable i, and, in the other case, the processing is advanced to step S1226. At step S1226, the variable tmp_id is subtracted from the pixel value of the period identification image ID and 128 is added to the pixel value. By doing so, the pixel value of the period identification image ID at the step edge portion becomes 128. Then, at step S1227, 1 is added to the variable j and the processing is returned to step S1225. In the present embodiment, the pixel value of the period identification image ID at the step edge portion is caused to become a predetermined number of 128, but the predetermined number is not limited to 128 and may be any value.

As described above, with the configuration of the three-dimensional shape measuring apparatus of the present embodiment, it is made possible to measure a three-dimensional shape of a target object whose density range is wide with a high accuracy and with a small number of captured images.

Second Embodiment

In the first embodiment, the three-dimensional shape measuring method is explained, which uses the image having one step edge shown in FIG. 4D as the reference position pattern. In the present embodiment, an example is explained in which an image having two step edges is used as the reference position pattern. The configuration of the three-dimensional shape measuring apparatus of the present embodiment is the same as the configuration described in the first embodiment unless explained in particular.

FIG. 13A shows an example of the reference position pattern in the present embodiment. Here, the broken lines at a portion 1301 and a portion 1302 indicate the positions of step edge portions. As described above, in the present embodiment, a pattern having two step edges is used as the reference position pattern. FIG. 13B is a line profile of a phase image whose phase value is calculated by expression (4) from the same stripe pattern as that in FIG. 5B. FIG. 13C is a line profile indicating a relationship between the pixel position and the pixel value of the reference position pattern shown in FIG. 13A.

As shown in FIG. 13C, the step edge portion is located at the two portions: the portion 1301 at which the pixel value changes from 255 to 0 and the portion 1302 at which the pixel value changes from 0 to 255. The positions of the two portions coincide with the positions at which each of the phase values becomes $\pi$ in FIG. 13B. The positions do not necessarily need to coincide with the positions at which the phase value becomes $\pi$ and it is only required for the step edge portions at the portion 1301 and the portion 1302 to be located at positions other than the period switch portion at which the phase becomes 0 or $2\pi$. By causing the step edge portion to be located at a position other than the period switch portion as described above, the processing becomes robust against overexposure or underexposure of the amount of exposure of image capturing at the time of projecting the reference position pattern onto the measurement-target object 101 and capturing the image thereof.

In the present embodiment, at the period identification image generation step, it is possible to perform the same processing as the detailed processing at step S1117 explained in FIG. 11A of the first embodiment. In this case, as the step edge portion, the edge portion at the portion 1302 is extracted and a period identification image is generated, in which the period identification number of the phase image corresponding to this position becomes a predetermined number (128 in the present embodiment). In a case in which it is assumed that the processing at step S1221 in FIG. 12A is processing to determine whether B (j−1, i)>B (j, i), the edge portion at the portion 131 is extracted and a period identification image is generated, in which the period of the phase image located at this position becomes a number (126 in the present embodiment) determined by referring to the above-described predetermined number. Here, an explanation is given in which the pixel value of the period identification image corresponding to the edge portion at the portion 1302 and that corresponding to the edge portion at the portion 1301 become 128 and 126, whose difference is 2 because the interval of the period of the positions at the portion 1301 and the portion 1302 shown in FIG. 13B is 2.

By performing both the two pieces of processing described above, two kinds of period identification image are generated: the period identification image in which the period identification number of the phase image located at the edge portion of the portion 1302 is 128 and the period identification image in which the period identification number of the phase image located at the edge portion of the portion 1301 is 126. By doing so, it is made possible to perform processing that is more robust against an error in period identification image generation by, for example, producing an error display for a user by determining that the period identification images are not generated correctly in a case in which the two kinds of period identification image are compared and the results of the comparison indicate that the two kinds of period identification image are different. It may also be possible to employ a configuration in which the two kinds of period identification image are displayed on the display device 202, or the like, and a user is caused to make selection. The values 126 and 128 explained as the periods of the period identification images are merely exemplary and the values are not limited to those noted above.

Other Embodiments

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

By the present invention, even in a case in which a measurement-target object has a wide density range, it is made possible to measure its three-dimensional shape with a high accuracy and with a small number of captured images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control apparatus for calculating a three-dimensional shape of an object based on an image, acquired by capturing images of the object from a plurality of directions, the control apparatus comprising:
   (A) at least one memory that stores instructions; and
   (B) at least one processor that executes the instructions stored in the at least one memory to function as:
      (a) a first acquiring unit configured to acquire a group of images, including (i) an image acquired by capturing an image of the object irradiated with first pattern light, an amount of the first pattern light changing periodically, in a predetermined direction, and (ii) an image acquired by capturing images of the object irradiated with second pattern light, an amount of the second pattern light changing periodically, in the predetermined direction, and having a phase difference from the first pattern light, by controlling an image capturing unit and a projection unit for each of the plurality of directions;
      (b) a second acquiring unit configured to acquire one image acquired by capturing an image of the object irradiated with third pattern light, that provides for identification of a position of at least one period, of a plurality of periods, included in one of the first pattern light and the second pattern light, by controlling the image capturing unit and the projection unit for each of the plurality of directions; and
      (c) a calculation unit configured to (i) calculate the three-dimensional shape of the object, based on the group of images and the one image, for each of the plurality of directions.

2. The control apparatus according to claim 1, wherein each of the first pattern light and the second pattern light is pattern light in a form of a stripe having a luminance that changes sinusoidally.

3. The control apparatus according to claim 1, wherein the first pattern light and the second pattern light are stripe pattern lights, and the third pattern light is created so that an edge portion, having an edge intensity greater than or equal to a predetermined value, is provided in parallel to a stripe of the stripe-pattern within the at least one period of the stripe pattern.

4. The control apparatus according to claim 3, wherein the edge portion of the third pattern light exists at a position other than a switch portion in which a period of a stripe of the stripe pattern switches from one of 0 and $2\pi$ to the other one of 0 and $2\pi$.

5. The control apparatus according to claim 1, wherein the at least one processor further executes the instructions to function as:
   (d) a first generation unit configured to generate, for each of the plurality of directions, a phase image having a phase value for each pixel based on the group of images;
   (e) a second generation unit configured to generate a period identification image, indicating a period identification number of each pixel of the phase image based on the one image and the phase image for each of the plurality of directions; and
   (f) a third generation unit configured to generate an unwrapped phase image by performing phase unwrapping of the phase image by using the period identification image for each of the plurality of directions,
   wherein the calculation unit is further configured to calculate the three-dimensional shape of the object, based on the unwrapped phase image for each of the plurality of directions.

6. The control apparatus according to claim 5, wherein the second generation unit extracts the position of the at least one period based on the one image for each of the plurality of directions, and generates the period identification image so that a period identification number of the phase image corresponding to the extracted position of the at least one period becomes a predetermined number common between the plurality of directions.

7. The control apparatus according to claim 6, wherein the second generation unit generates a binarized image based on the one image for each of the plurality of directions and extracts the position of the at least one period based on the binarized image.

8. The control apparatus according to claim 5, wherein the first acquiring unit controls the image capturing unit so that, for each piece of projection of the first pattern light and the second pattern light, the image capturing unit captures images of the object from the plurality of directions under a plurality of exposure conditions, and the second acquiring unit controls the image capturing unit so that, for projection of the third pattern light, the image capturing unit captures images of the object from the plurality of directions under one exposure condition.

9. The control apparatus according to claim 8, wherein the at least one processor further executes the instructions to function as (g) a combination unit configured to generate a combined image by combining the plurality of images captured under the plurality of exposure conditions for each of the plurality of directions and for each piece of projection of the first pattern light and the second pattern light, and
   wherein the first generation unit generates the phase image based on the combined image.

10. The control apparatus according to claim 5, wherein the calculation unit is further configured:
    to search for a corresponding point at which a phase value of the unwrapped phase image is the same in the plurality of directions based on the unwrapped phase image; and
    to calculate the three-dimensional shape of the object by using the principle of triangulation based on the corresponding point at which a phase value of the unwrapped phase image is the same in the plurality of directions based on the unwrapped phase image.

11. A control method for calculating a three-dimensional shape of an object based on an image, acquired by capturing images of the object from a plurality of directions, the control method comprising:
    a first acquiring step of acquiring a group of images, including (a) an image acquired by capturing an image of the object irradiated with first pattern light, an amount of the first pattern light changing periodically, in a predetermined direction, and (b) an image acquired by capturing images of the object irradiated with second pattern light, an amount of the second pattern light changing periodically in the predetermined direction, and having a phase difference from the first pattern light, by controlling an image capturing unit and a projection unit for each of the plurality of directions;

a second acquiring step of acquiring one image acquired by capturing an image of the object irradiated with third pattern light, that provides for identification of a position of at least one period of a plurality of periods included in one of the first pattern light and the second pattern light, by controlling the image capturing unit and the projection unit for each of the plurality of directions; and a calculation step of calculating the three-dimensional shape of the object based on the group of images and the one image, for each of the plurality of directions.

12. A non-transitory computer readable storage medium storing a program for causing a computer to function as a control apparatus for calculating a three-dimensional shape of an object based on an image, acquired by capturing images of the object from a plurality of directions, the control apparatus comprising:

(A) at least one memory that stores instructions; and
(B) at least one processor that executes the instructions stored in the at least one memory to function as:
  (a) a first acquiring unit configured to acquire a group of images, including (i) an image acquired by capturing an image of the object irradiated with first pattern light, an amount of the first pattern light changing periodically, in a predetermined direction, and (ii) an image acquired by capturing images of the object irradiated with second pattern light, an amount of the second pattern light changing periodically, in the predetermined direction, and having a phase difference from the first pattern light by controlling an image capturing unit and a projection unit for each of the plurality of directions;
  (b) a second acquiring unit configured to acquire one image acquired by capturing an image of the object irradiated with third pattern light, that provides for identification of a position of at least one period, of a plurality of periods, included in one of the first pattern light and the second pattern light, by controlling the image capturing unit and the projection unit for each of the plurality of directions; and
  (c) a calculation unit configured to calculate the three-dimensional shape of the object, based on the group of images and the one image, for each of the plurality of directions.

13. A three-dimensional shape measuring apparatus comprising:

(A) a projection unit configured to project (a) a stripe pattern having a luminance that changes periodically, and (b) a reference position pattern indicating a position of at least one period, of a plurality of periods of the stripe pattern, as a reference position, onto a measurement target object;
(B) an image capturing unit configured to capture images of the measurement target object from a plurality of directions;
(C) at least one memory that stores instructions; and
(D) at least one processor that executes the instructions to function as:
  (a) a control unit configured to control the projection unit and the image capturing unit, (i) to acquire a captured image of the stripe pattern by capturing images of the measurement target object from the plurality of directions under a plurality of exposure conditions, at a time at which the stripe pattern is projected, and (ii) to acquire a captured image of the reference position pattern by capturing images of the measurement target object from the plurality of directions under one exposure condition, at a time at which the reference position pattern is projected; and
  (b) a shape calculation unit configured to calculate a three-dimensional shape of the measurement-target object based on the captured image of the stripe pattern and the captured image of the reference position pattern, the shape calculation unit including:
    (i) a phase image generation unit configured to generate a phase image based on the captured image of the stripe pattern for each direction, of the plurality of directions;
    (ii) a generation unit configured to generate a period identification image indicating a period identification number of each pixel position of the phase image, based on the phase image and a captured image of the reference position pattern for each direction, of the plurality of directions; and
    (iii) a phase unwrapping unit configured to generate an unwrapped phase image by performing phase unwrapping of the phase image using the period identification image for each direction, of the plurality of directions,
  wherein the shape calculating unit calculates a three-dimensional shape of the measurement target object based on the unwrapped phase image.

* * * * *